(12) United States Patent
Willerth et al.

(10) Patent No.: US 11,306,581 B2
(45) Date of Patent: Apr. 19, 2022

(54) ADAPTIVE QUALITY CONTROL FOR MONITORING WELLBORE DRILLING

(71) Applicant: Magnetic Variation Services, LLC, Westminster, CO (US)

(72) Inventors: Marc Ernest Willerth, San Luis Obispo, CA (US); Stefan Maus, Boulder, CO (US)

(73) Assignee: MAGNETIC VARIATION SERVICES, LLC, Denver, CO (US)

( * ) Notice: Subject to any disclaimer, the term of this patent is extended or adjusted under 35 U.S.C. 154(b) by 532 days.

(21) Appl. No.: 16/156,982

(22) Filed: Oct. 10, 2018

(65) Prior Publication Data

US 2019/0106982 A1    Apr. 11, 2019

Related U.S. Application Data

(60) Provisional application No. 62/655,675, filed on Apr. 10, 2018, provisional application No. 62/570,865, filed on Oct. 11, 2017.

(51) Int. Cl.

| | | |
|---|---|---|
| *E21B 44/00* | (2006.01) | |
| *E21B 47/092* | (2012.01) | |
| *E21B 44/06* | (2006.01) | |
| *E21B 47/024* | (2006.01) | |
| *E21B 7/04* | (2006.01) | |
| *E21B 47/04* | (2012.01) | |
| *G01V 3/00* | (2006.01) | |
| *E21B 47/12* | (2012.01) | |

(52) U.S. Cl.
CPC .............. *E21B 47/092* (2020.05); *E21B 7/04* (2013.01); *E21B 44/06* (2013.01); *E21B 47/024* (2013.01); *E21B 47/04* (2013.01); *G01V 3/00* (2013.01); *E21B 47/12* (2013.01)

(58) Field of Classification Search
CPC .......... E21B 47/092; E21B 7/04; E21B 44/06; E21B 47/024; E21B 47/04; G01V 3/00
See application file for complete search history.

(56) References Cited

U.S. PATENT DOCUMENTS

| | | | | |
|---|---|---|---|---|
| 5,883,515 | A | * | 3/1999 | Strack ....................... G01V 3/28 324/339 |
| 2003/0046005 | A1 | * | 3/2003 | Haarstad ................ E21B 47/022 702/9 |
| 2004/0160223 | A1 | | 8/2004 | McElhinney |

(Continued)

OTHER PUBLICATIONS

International Search Report, PCT/US18/55297, dated Jan. 8, 2019.

(Continued)

*Primary Examiner* — Mohamed Charioui
*Assistant Examiner* — Christine Y Liao
(74) *Attorney, Agent, or Firm* — Kilpatrick Townsend & Stockton LLP

(57) ABSTRACT

A method of validating a directional survey includes measuring the gravity and magnetic field vectors using a surveying tool and computing an overall statistical distance of the measurement. The statistical distance may be calculated from reference values associated with the surveying tool using corresponding surveying tool codes with error values. In a further aspect, an error covariance matrix may be used to determine whether the new errors m a survey are consistent or not with errors from one or more previous surveys.

40 Claims, 11 Drawing Sheets

(56) References Cited

U.S. PATENT DOCUMENTS

| | | | |
|---|---|---|---|
| 2010/0169018 A1* | 7/2010 | Brooks | E21B 47/022 |
| | | | 702/9 |
| 2015/0331138 A1 | 11/2015 | Estes et al. | |
| 2016/0194949 A1* | 7/2016 | Dirksen | E21B 43/305 |
| | | | 702/9 |
| 2016/0201449 A1 | 7/2016 | Dirksen et al. | |
| 2019/0024500 A1* | 1/2019 | DeVerse | E21B 47/022 |

OTHER PUBLICATIONS

Jamieson, A., "Introduction to Wellbore Positioning," University of the Highlands and Islands Oilthigh na Gaidhealtachd agus nan Eilean, 2012.

\* cited by examiner

ADAPTIVE QUALITY CONTROL FOR MONITORING WELLBORE DRILLING

CROSS-REFERENCE TO RELATED APPLICATIONS

This application claims priority to U.S. Provisional Patent Application Ser. No. 62/570,865 filed on Oct. 11, 2017, which is incorporated herein by reference in its entirety, and claims priority to U.S. Provisional Patent Application Ser. No. 62/655,675, filed on Apr. 10, 2018, which is incorporated herein by reference in its entirety.

BACKGROUND

Field of the Disclosure

The present disclosure relates generally to drilling of wells for oil and gas production and, more particularly, to adaptive quality control for monitoring wellbore drilling.

Description of the Related Art

In well placement using measurement-while-drilling (MWD), Earth's gravity acceleration and geomagnetic field are used as a natural reference frame. A MWD tool may measure a survey of the acceleration vector and the magnetic field vector to determine a 3D orientation of the MWD tool, including to infer an inclination angle and an azimuth angle of the bottom hole assembly (BHA). From consecutive MWD surveys, the well trajectory can be determined in this manner and can be used to validate that the actual well trajectory remains on target with a planned well trajectory.

The determination of the well trajectory from an MWD survey may involve various calculations that depend upon reference values and measured values. However, various internal and external factors may adversely abet an MWD survey and, in turn, the determination of the well trajectory. Furthermore, certain measurement thresholds used for quality control (QC) of different measurements may not be uncorrelated with each other, as is commonly assumed in conventional QC methods.

SUMMARY

In one aspect, a first system for monitoring drilling is disclosed. The first system may include a processor, a memory coupled to the processor. In the first system, the memory may include instructions executable by the processor for, during drilling of a borehole by a drilling system, receiving a first survey from a measurement-while-drilling (MWD) tool. In the first system, the first survey may include a first measurement of a gravity vector G and a second measurement of a magnetic field vector B. The first system may further include instructions for calculating a magnetic dip angle φ responsive to the second measurement of the magnetic field vector B, generating, responsive to tool codes for the MWD tool that define error values for the first measurement and the second measurement, a first covariant matrix describing the relationship of a plurality of measured values to expected errors in the measured values; generating a plurality of residual values corresponding to the first measurement and the second measurement as a difference between a reference value and a measured value for each of first measurement of the gravity vector G and the second measure lent of the magnetic field vector B, computing, responsive to the residual values and the first covariant matrix, an error ellipsoid describing bounds for residual values for the first measurement of the gravity vector G and the second measurement of the magnetic field vector B, and comparing the first survey with the error ellipsoid to determine if the first survey is acceptable. When the first survey is not acceptable based en the error ellipsoid, the first system may further include instructions for generating a first indication that the drilling should stop.

In any of the disclosed embodiments, the first system may further include instructions for, when the first indication is generated, generating a second indication that an expert assessment of a trajectory of the borehole is to be performed before drilling resumes.

In any of the disclosed embodiments, the first system may further include instructions for generating a plurality of second residual values based on differences between a plurality of previously measured values of the gravity vector G and the magnetic vector B, and the most recent measurements of the gravity vector G and the magnetic, vector B, generating a second covariant matrix describing the relationship of measured values to expected errors in the measured values based on the previously measured values, and computing a second error ellipsoid describing bounds for residual values for the first measurement of the gravity vector G and the second measurement of the magnetic field vector B responsive to the second residual values and the second covariant matrix.

In any of the disclosed embodiments of the first system, the instructions for comparing the first survey with the error ellipsoid to determine if the first survey is acceptable may further include instructions for computing a statistical distance associated with the first measurement of the gravity vector G and the second measurement of the magnetic field vector B responsive to the tool codes.

In any of the disclosed embodiments, the first system may further include instructions for displaying the statistical distance against a sigma threshold.

In any of the disclosed embodiments of the first system, the instructions for comparing the first survey with the error ellipsoid to, determine if the first survey is acceptable may further include instructions for classifying the first survey as pass or lint, based on a value of the statistical distance with respect to the sigma threshold.

In any of the disclosed embodiments of the first system, the instructions for comparing the first survey with the error ellipsoid to determine if the first survey is acceptable may further include instructions for computing a probability associated with the first measurement of the gravity vector G and the second measurement of the magnetic field vector B responsive to the tool codes.

In any of the disclosed embodiments, the first system may further include instructions for displaying the probability against a probability threshold.

In any of the disclosed embodiments of the first system, the instructions for comparing the first survey with the error ellipsoid to determine if the first survey is acceptable may further include instructions for classifying the first survey as pass or fail, based on a value of the probability with respect to the probability threshold.

In any of the disclosed embodiments of the first system, the probability may be a Mahalanobis distance.

In another aspect, a first method for monitoring drilling is disclosed. The first method may include during drilling of a borehole by a drilling system, receiving a first survey front measurement-while-drilling (MWD) tool. In the first method, the first survey may include a plurality of measurements of a gravity vector and a magnetic field vector. The first method may further include using the magnetic field vector, calculating a magnetic dip angle, responsive to plurality of tool codes for the MWD tool that define error values for the plurality of measurements, generating a first covariant matrix describing the relationship of measurements to expected errors in the measurements, and generating a plurality of residual values corresponding to the plurality of measurements in the first method, each residual value may include a difference between a reference value and a measured value for each of the plurality of measurements. The first method may further include, responsive to the residual values and the first covariant matrix, computing an error ellipsoid describing bounds for residual values for the plurality of measurements, and comparing the first survey with the error ellipsoid to determine if the first survey is within acceptable limits. When the first survey is not within acceptable limits, the first method may further include generating a first indication that the drilling should stop.

In any of the disclosed embodiments, the first method may further include, when the first indication is generated, generating a second indication that an expert assessment of a trajectory of the borehole should be performed before drilling resumes.

In any of the disclosed embodiments, the first method may further include generating second residual values based on differences between previously obtained measurements and the measured value for each of the plurality of measurements, generating a second, covariant matrix describing the relationship of measured values to expected errors in the measured values based on the previously measured values, and, responsive to the second residual values and the second covariant matrix, computing the error ellipsoid describing bounds for residual values for the measurements.

In any of the disclosed embodiments of the first method, comparing the first survey with the error ellipsoid to determine if the first survey is acceptable may further include computing a statistical distance associated with the measurements based on the tool codes.

In any of the disclosed embodiments, the first method may further include displaying the statistical distance against a sigma threshold.

In any of the disclosed embodiments of the first method, comparing the first survey with the error ellipsoid to determine if the first survey is acceptable may further include classifying the first survey as pass or fail, based on a value of the statistical distance with respect to the sigma threshold.

In any of the disclosed embodiments of the first method, comparing the first survey with the error ellipsoid to determine if the first survey is acceptable may further include computing a probability associated with the measurements based on the tool codes.

In any of the disclosed embodiments, the first method may further include displaying the probability against a probability threshold.

In any of the disclosed embodiments of the first method, comparing the first survey with the error ellipsoid to determine if the first survey is acceptable may further include classifying the first survey as pass or fail, based on a value of the probability with respect to the probability threshold.

In any of the disclosed embodiments of the first method, the probability may be a Mahalanobis distance.

In any of the disclosed embodiments, the first method may further include displaying at least one indication of the gravity vector, the magnetic field vector, and the magnetic dip angle together with inner error limits, while the inner error limits may define a pass range.

In any of the disclosed embodiments, the first method may further include displaying at least one indication of the gravity vector, the magnetic field vector, and the magnetic dip angle together with outer error limits, wherein the outer error limits define a fail, threshold.

In any of the disclosed embodiments, the first method may further include displaying at least one indication of the gravity vector, the magnetic field vector, and the magnetic dip angle together with both inner error limits and outer error limits, wherein the ranges between the inner error limits and the outer error limits indicate a pass or fail range.

In yet another aspect, a second system for monitoring drilling is disclosed. The second system may include a processor, a memory coupled to the processor, a display device coupled to the processor. In the second system the memory may include instructions executable by the processor for, during drilling of a borehole by a drilling system, receiving a first survey from a measurement-while-drilling (MWD) tool. In the second system, the first survey may include measurements of a gravity vector and a magnetic field vector. The second system may further include instructions for, responsive to the magnetic field vector, calculating a magnetic dip angle, responsive to tool codes for the MWD tool that define error values corresponding to the measurements, generating a first covariant matrix describing the relationship of a plurality of measured values to a plurality of expected errors in the measured values, generating residual values corresponding to the measurements as differences between each reference value and each associated measured value for each of the measurements, responsive to the residual values and the first covariant matrix, computing a statistical distance associated with the measurements, the statistical distance describing bounds for residual values for the measurements, and displaying on the display device a comparison of at least a portion of the first survey with the statistical distance to provide a visual indication of whether the survey is within acceptable limits.

In any of the disclosed embodiments, the second system may further include instructions for, when the first survey is not within acceptable limits, generating a first indication that the drilling should stop.

In any of the disclosed embodiments, the second system may further include instructions for, when the first indication is generated, generating a second indication that an expert assessment of a wellbore trajectory of the borehole is to be performed before drilling can resume.

In any of the disclosed embodiments, the second system may further include instructions for generating second residual values based on differences between previously measured values and a most recently measured value for each of the measurements, generating a second covariant matrix describing the relationship of measured values to expected errors in the measured values based on the previously measured values, and using the second residual values and the second covariant matrix, computing the statistical distance describing bounds for residual values for the measurements.

In any of the disclosed embodiments of the second system, the instructions for comparing the first survey with the statistical difference to determine if the first survey is acceptable may further include instructions for computing an error ellipsoid associated with the measurements based on the tool codes.

In any of the disclosed embodiments, the second system may further include instructions for displaying the error ellipsoid against at least one sigma threshold.

In any of the disclosed embodiments of the second system, the instructions for comparing the first survey with the error ellipsoid to determine if the first survey is acceptable may further include instructions for classifying the first survey as pass or fail, based on a value of the statistical distance with respect to the sigma threshold.

In any of the disclosed embodiments of the second system, a sigma threshold may be displayed as a rectangle bounded by the error ellipsoid.

In any of the disclosed embodiments of the second system, the comparison may be displayed as a plot with at least one shaded region representing a QC threshold. In any of the disclosed embodiments of the second system, the comparison may be displayed as a plot of measurement values bounded by inner limits and outer limits.

In any of the disclosed embodiments of the second system, the inner limits may indicate pass or fail of the measurement values and the outer limits may indicate fail of the measurement values.

In any of the disclosed embodiments of the second system, the area between the inner limits may be displayed as a first color, and the area between each inner limit and the corresponding, outer limit may be displayed as a second color. In any of the disclosed embodiments of the second system, the first color may be green. In any of the disclosed embodiments of the second system, the second color may be yellow.

In any of the disclosed embodiments, the second system may further include instructions for accessing data from at least one previous survey of the borehole performed prior to the first survey, while the inner limits and the outer limits may be adaptive responsive to the at least one previous survey. In any of the disclosed embodiments of the second system, the visual indication may be updated with additional data responsive to a second survey performed after the first survey. In any of the disclosed embodiments of the second system, the visual indication may be updated with additional data as the borehole is drilled.

In yet another aspect, a second method of validating a directional survey includes defining quality control (QC) criteria directly from the error model that is used to compute the uncertainties of the well trajectory. The error model describes errors of the measurement while drilling (MWD) tool and additional factors, such as the error in reference values, external interference, the impact of corrections applied to the measurements, and correlation of errors between separate survey measurements. While error models (tool codes were designed to compute the uncertainties of the well trajectory, the error models may also be used to derive the uncertainties of an individual MWD measurement. In the same way that 3D error ellipsoids of the wellbore location are computed, 3D error ellipsoids for G, B and magnetic dip angle φ can also be computed.

In another aspect a third method of validating a directional survey includes measuring the gravity and magnetic field vectors using a surveying tool and computing an overall statistical distance of the measurement from its reference values, for a given surveying tool error model.

In a further aspect, a fourth method of validating a directional survey includes measuring the gravity and magnetic field vectors using a surveying tool, computing the parameters total gravity strength, total magnetic field strength, and magnetic dip, and computing individual statistical distances between these parameters and their reference values for a given surveying tool error model.

In still another aspect, a fifth method of validating a directional survey includes measuring the gravity and magnetic field vectors using a surveying tool, computing the parameters total gravity strength, total magnetic field strength, and magnetic dip, and computing inner and outer error bounds for each of these parameters.

In a further aspect, a sixth method of validating a directional survey includes measuring the gravity and magnetic field vectors using a surveying tool and computing an overall statistical distance of the measurement from a conditional expectation derived from reference values for a given tool error model and prior survey measurements collected of the gravity and magnetic field vectors.

In yet a further aspect, a seventh method of validating a directional survey includes taking a number of measurements of the gravity and magnetic field vectors using a surveying tool or set of survey tools, computing an overall statistical distance of the set from reference values for a given tool error and evaluating this statistical distance with respect to the information content of the set.

BRIEF DESCRIPTION OF DRAWINGS

The following is a description of the figures in the accompanying drawings. The figures are not necessarily to scale, and certain figures and certain views of the figures may be shown exaggerated in scale or in schematic in the interest of clarity and conciseness.

DETAILED DESCRIPTION

Figure 1:
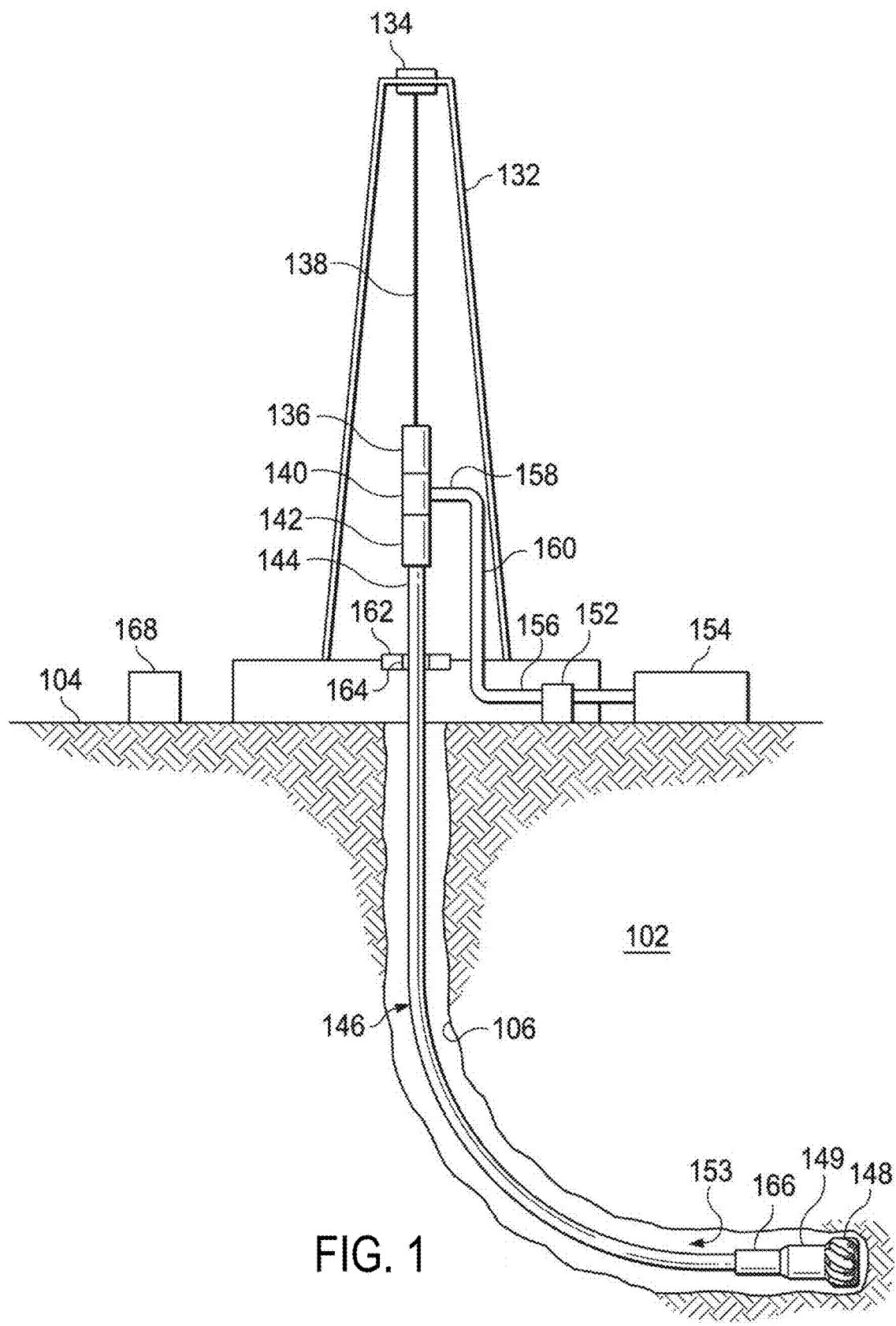
FIG. 1 is a depiction of a drilling system for drilling a borehole.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12" refers to an instance of a device class, which may be referred to collectively as devices "12" and any one of which may be referred to generically as a device "12". In the figures and the description, like numerals are intended to represent like elements.

As noted above, various factors associated with the performance of MWD surveys may affect the determination of the well trajectory. For example, the accuracy of the well trajectory determination may depend on the performance of an MWD tool used for an MWD survey. It may therefore be useful to apply quality control (QC) to each MWD survey to monitor and evaluate the performance of the MWD tool.

As will be disclosed in further detail, application of QC to an MWD survey can be accomplished by comparing a measured gravity field strength (given by a Vector G), a measured magnetic field strength (given by a vector B), and a magnetic dip angle (given as an angle $\varphi$) with respective reference values that may be given or may be obtained from previous surveys. The differences between the measured values and the reference values are called "residual values". Various different QC criteria may be defined based on these residual values, including QC criteria disclosed herein for adaptive quality control for monitoring wellbore drilling.

In some conventional processing methods, given QC thresholds for B, G and $\varphi$ may be defined as QC pass or Ml criteria for an MWD survey. When the QC thresholds an exceeded, the MWD survey is said to fail QC and should not be used for determination of the well trajectory. The conventional approach with given QC thresholds may have certain shortcomings, such as, but not limited to: (1) a reliance on three separate measurements, which may not consider any cross-correlation of among the measurements; (2) no relation of the QC criteria to known uncertainties in the determination of the wellbore trajectory; and (3) failure to evaluate the survey results as a collection of survey sets rather than as isolated data points. Therefore, an improved approach for validating directional surveys is disclosed herein as adaptive quality control for monitoring wellbore drilling.

Application of QC for adaptive quality control for monitoring wellbore drilling, as disclosed herein, may be used as an integrated part of a drilling process that is implemented using a drilling system. The results of application of the QC criteria to each respective MWD survey performed may be used to evaluate the quality of the measurement, and ultimately determine whether the last measurement could be validated as being acceptable for drilling purposes, such as for determining the well trajectory. In other words, QC using adaptive quality control for monitoring wellbore drilling may improve a determination of the plausibility of each measurement from an MWD survey. The level of acceptability, as well as other QC criteria, for actual drilling purposes may be set forth, along with other information and parameters, in a drilling plan that may define the drilling operations and also may specify the well trajectory.

A method for adaptive quality control for monitoring wellbore drilling, as disclosed herein, may perform MWD surveys while drilling proceeds along a well trajectory. Each of the MWD surveys may be evaluated using adaptive QC criteria to make a decision whether or not drilling should continue. When the last MWD survey is validated using the adaptive quality control for monitoring wellbore drilling disclosed herein, an indication may, be generated that drilling can continue. The indication that the last MWD survey was validated may be incorporated as a digital signal or digital information that is used by another control system in the drilling system, such as in order to control the drilling process or in order to not stop the drilling process. When the last MWD survey is not validated using the adaptive quality control for monitoring wellbore drilling disclosed herein, an indication may be generated that drilling should stop. The indication that the last MWD survey was not validated may be incorporated as a digital signal or digital information that is used by another control system in the drilling system, such as in order to control the drilling process or in order to stop the drilling process.

A method for adaptive quality control for monitoring wellbore drilling, as disclosed herein, may further include defining QC criteria directly from the uncertainties in the determination of the well trajectory. The uncertainties may be given as certain error values that describe errors of the MWD tool and additional factors, such as an error in reference values, external interference, an impact of corrections applied to the measurements, and a correlation of errors between separate survey measurements. It is noted that certain error values (e.g., MWD tool codes that define instrument parameters) are given that may be used to compute the uncertainties of the well trajectory. In adaptive quality control for monitoring wellbore drilling, as disclosed herein, the same error values may also be used to derive the uncertainties of an individual MWD measurement. The uncertainties resulting from the QC process may be presented as 3D error ellipsoids for values of B, G, and $\varphi$ obtained from MWD surveys. The error ellipsoids may present the error in three dimensional coordinates along borehole 106, while the errors for B, G, and $\varphi$ may be related to each other, at least to a certain degree, along at least one dimensional axis.

In directional drilling, the well trajectory may be reconstructed from a pipe tally (measured depth, MD) combined with surveys of an inclination angle and an azimuth angle of the borehole or the drill string. Accordingly, point measurements of MD, the inclination angle, and the azimuth angle may then combined to generate a continuous determination of the well trajectory. In some instances, the point measurements may be combined using a minimum curvature interpolation to generate the determination of the well trajectory. The positional errors of the determination of the well trajectory may be described by ellipsoids of uncertainty (EOU), where the axes of a three dimensional (3D) coordinate system used to specify the ellipsoids may indicate standard error in the lateral, vertical, and along-hole directions, respectively.

The along-hole directional error may be considered related to the drill pipe and is not considered further here.

For the cross-hole errors (i.e., the lateral directional errors and the horizontal directional errors for straight vertical drilling), the following sources of error may be taken into account instrument biases and scale factors; sensor misalignments within the MWD tool; misalignment of the MWD sensor with the borehole; sensor misalignments due to the bending (i.e., sag) of the drill string component housing using the MWD tool; magnetic interference from the drill string; and errors in the gravity and geomagnetic reference values, a long other sources of errors. Even when the exact source of the error is unknown, as long as the relationship of the error to QC criteria is known, the extent of the error can be estimated using adaptive quality control for monitoring wellbore drilling.

Each, of the sources of cross-hole errors may be quantified by one or more error coefficients and may be associated with a propagation mode. The errors may then be translated using the error coefficients into corresponding errors of the inclination angle and the azimuth angle, which may then be propagated along-hole to determine a cumulative error of the well trajectory. In a similar manner as determining the error in the well trajectory, the methods for adaptive quality control for monitoring wellbore drilling, as disclosed herein, determine an expected error in actual measurements from an MWD tool used for an MWD survey.

As a result of adaptive quality control for monitoring wellbore drilling, as disclosed herein, three independent parameters may be computed, namely: strength of the gravity field (G), strength of the magnetic field (B), and magnetic dip angle φ. B, G, and φ may be computed from as MWD survey and are, thus, derived from measured values. Reference values for B and G may be obtained from global references, or from previous survey information obtained from previous drilling. After subtracting the reference values from the values of B and G derived from measured values, the residual values are calculated. The residual values may be used to define QC criteria and to apply the results of QC analysis to drilling operations. For example, when a particular survey fails the QC criteria, a measurement from an MWD tool may be flagged as having failed QC. The failed measurement may then be excluded from the computation of the well trajectory. Alternatively, remedial actions may be taken to either improve the quality of the survey or assign the survey to another instrument specification of reduced accuracy.

Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a traveling block 136 is coupled via a drilling line 138. In drilling system 100, a top drive 140 is coupled to traveling block 136 and provides rotational three for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture 153 (e.g., a mud mixture) from a mud pit 154 into drill string 146. Mud pit 154 is shown schematically as a container, but it will be understood that various receptacles, tanks, pits, or other containers may be used. Mud 153 may flow from mud pump 152 into a discharge line 156 that is coupled to a rotary hose 158 by a standpipe 160. Rotary hose 158 may then be coupled to top drive 140, which includes a passage for mud 153 to flow into borehole 106 via drill string 146 from where mud 153 may emerge at drill bit 148. Mud 153 may lubricate drill bit 148 during drilling and, due to the pressure supplied by mud pump 152, mud 153 may return via borehole 106 to surface 104.

Sensing, detection, measurement, and evaluation functionality may be incorporated into a downhole tool 166 or BHA 149 or elsewhere along drill daring 146 to provide MWD surveys of borehole 106. Accordingly, downhole tool 166 may be an MWD tool and may have corresponding connectivity to ground 146. For example, gamma radiation sensors, magnetometers, accelerometers, and other types of sensors may be used for the MWD surveys. Although downhole tool 166 is shown in singular in drilling system 100, it will be understood that multiple instances (not shown) of downhole tool 166 may be located at one or more locations along drill string 146.

In some embodiments, formation detection and evaluation functionality may be provided via a control system 168 on the surface 104. The control system 168 may be located in proximity to derrick 132 or may be included with drilling system 100. In other embodiments, such as when drilling system 100 is equipped with a communication network (not shown), control system 168 may be remote from the actual location of borehole 106. For example, control system 168 may be a stand-alone system or may be incorporated into other systems included with drilling system 100.

In operation, control system 166 may receive formation information via the communication network. In some embodiments, control system 168 may use the evaluation functionality to provide convergence plans or other corrective measures. The convergence plans or other corrective measures may depend on the determination of the well trajectory, and therefore, may be improved in accuracy using adaptive quality control for monitoring wellbore drilling, as disclosed herein. In various embodiments, at least a portion of control system 168 may be located in downhole tool 166 (not shown). In some embodiments, control system 168 may communicate with a separate controller (not shown) located in downhole tool 166. In particular, control system 168 may receive and process measurements received from MWD surveys and may perform the calculations described herein for adaptive quality control for monitoring wellbore drilling using the MWD surveys and other information referenced herein.

Drilling a well typically involves a substantial amount of human decision making during the drilling process. For example, geologists and drilling engineers use their knowledge, experience, and the available information to make decisions on how to plan the drilling operation, how to accomplish the drilling plan, and how to handle issues that arise during drilling. However, even the best geologists and drilling engineers perform some guesswork due to the unique nature of each borehole. Furthermore, a directional driller directly responsible for the drilling may have drilled other boreholes the same region and so may have some similar experience, but it is impossible for a human to mentally track all the possible inputs and factor those inputs into a decision. This can result in expensive mistakes, as errors in drilling can add hundreds of thousands or even millions of dollars to the drilling cost and, in some cases, drilling errors may permanently lower the output of a well, resulting in substantial long term losses.

In the present example, to aid in the drilling process, each well has corresponding collected data, such as from sensors in the bottom hole assembly, the MWD tool, or both. The collected data may include the geological characteristics of a particular formation in which the corresponding well was formed, the attributes of a particular drilling rig, including the bottom hole assembly (BHA), and drilling information such as weight-on-bit (WOB), drilling speed, and other information pertinent to the formation of that particular borehole. The drilling information may be associated with a particular depth or other identifiable marker so that, for example, it is recorded that drilling of the well from 1,000 feet to 1,200 feet occurred at a first rate of penetration (ROP)

through a first rock layer with a first WOB, while drilling from 1,200 feet to 1,500 feet occurred at a second ROP through a second rock layer with a second WOB. The collected data may be used to recreate the drilling process used to create the corresponding well in the particular formation. It is understood that the accuracy with which the drilling process can be recreated depends on the level of detail and accuracy of the collected data, including data from an MWD survey of the well trajectory.

The collected data may be stored in a centralized database, which may be connected via a communication channel to at least one computer, server, network, or combinations thereof. The database or computer systems may be located at a drilling hub (not shown) or elsewhere. Alternatively, the data may be stored on a removable storage medium that is later coupled to the database in order to transfer the data to the database.

An on-site controller may be located at or near the surface where a well is being drilled. The controller may be coupled to the drilling rig and may also be coupled to the database. Other inputs, including data from a magnetometer, and an accelerometer may also be provided to the on-site controller. In some embodiments, the on-site controller may operate as a stand-alone device with the drilling rig. For example, the on-site controller may not be communicatively coupled to the database. Although it may be positioned near or at the drilling rig in the present example, it is to be understood that some or all components of the on-site controller may be distributed and physically located elsewhere in other embodiments, such as at a remotely located control center if desired. The controller may include a computer processor and a storage device, such as a memory storing instructions executable by the processor, the instructions being enabled, when executed, for performing adaptive quality control for monitoring wellbore drilling, as disclosed herein.

The on-site controller may further form all or part of a surface steerable system. The database may also form part of the surface steerable system. The surface steerable system may be used to plan and control drilling operations based on input information, including feedback from the drilling process itself. The surface steerable system may be used to perform operations, such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within, a defined margin of error of the drill path, and calculating corrections for the drilling process if the drilling process is outside of the margin of error. In addition, the on-site controller may form a portion of the MWD tool or the BHA.

In the present example, the drilling rig includes drilling equipment used to perform the drilling of a borehole, such as top drive or rotary drive equipment that couples to the drill string and BHA, and is configured to rotate the drill string and apply pressure to the drill bit. The drilling rig may include control systems such as a WOB/differential pressure control system, a positional rotary control system, and a fluid circulation control system. The control systems may be used to monitor and change drilling rig settings, such as the WOB or differential pressure to alter the ROP or the radial orientation of the toolface, change the flow rate of drilling mud, and perform other operations. The drilling rig may also include a sensor system for obtaining sensor data about the drilling operation and the drilling rig, including the downhole equipment. For example, the sensor system may include MWD or logging while drilling (LWD) components for obtaining information such as toolface and formation logging information that may be saved the later retrieval, transmitted with a delay or in real time using any of various communication means (e.g., wireless, wireline, or mud pulse telemetry), or otherwise transferred to the on-site controller. Such information may include information related to hole depth, bit depth, inclination, azimuth, true vertical depth, gamma count, standpipe pressure, mud flow rate, rotary rotations per minute (RPM), bit speed, ROP, WOB, and other information. It is understood that, all or part of the sensor system may be incorporated into a control system, or in another component of the drilling equipment. As the drilling rig can be configured in many different ways, it is understood that these control systems may be different in some embodiments, and may be combined or further divided into various subsystems.

The on-site controller may receive input information directly or indirectly from one or more sensors, as well as survey information, either during or after drilling of the wellbore. The input information may include information that is pre-loaded, received, and updated in real time. The input information lay also include a well plan, regional formation history, drilling engineer parameters, MWD tool face/inclination. Information, LWD gamma/resistivity information, economic parameters, reliability parameters, and other decision guiding parameters. Some of the inputs, such as the regional formation history, may be available from a drilling hub, which may include the database and the processor (not shown), while other inputs may be accessed or uploaded from other sources. For example, a web interface may be used to interact directly with the on-site controller to upload the well plan or drilling engineer parameters. The input information may be provided to the on-site controller and, after processing by the on-site controller, may result in control information that may be output to the drilling rig (e.g., to the control systems). The drilling rig (e.g., via the control systems) may provide feedback information to the on-site controller. The feedback information may then serve as input to the on-site controller, enabling the on-site controller to verify that the current control information is producing the desired results or to produce new control information for the drilling rig, which may include instructions for adjusting one or more drilling parameters, the direction of drilling, the appropriate drilling mode, and the like, and may further include instructions to the control systems to automatically drill in accordance with the updated information regarding the location of the BHA as determined using adaptive quality control for monitoring wellbore drilling, as disclosed herein.

Figure 2A:
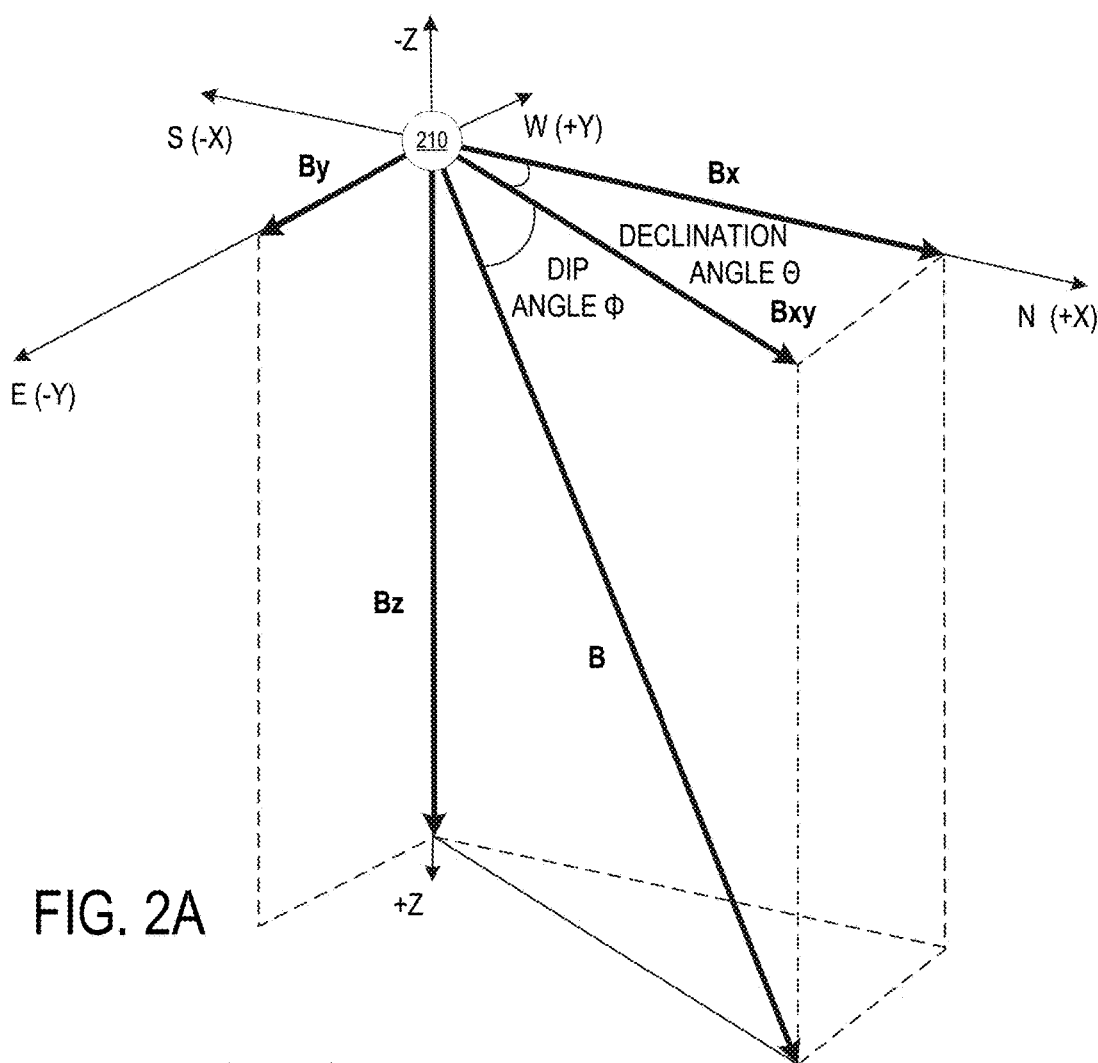
FIG. 2A is a geometric depiction of magnetic field vectors as generated by a magnetometer.
Figure 2B:
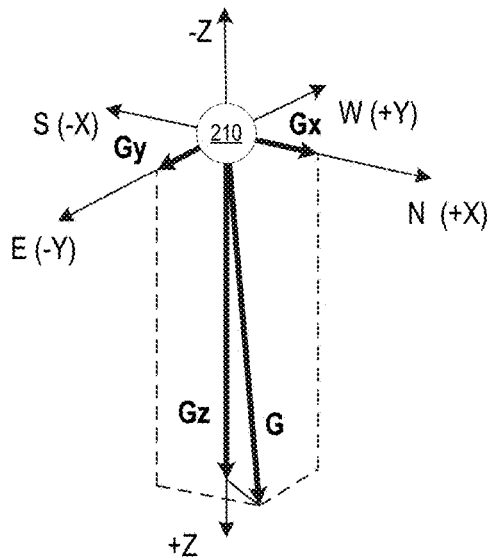
FIG. 2B is a geometric depiction of gravity vectors as generated by an accelerometer.

Referring now to FIGS. 2A and 2B, Cartesian-coordinate vector diagrams are shown depicting certain measurements that are used to derive QC parameters for adaptive quality control for monitoring wellbore drilling, as disclosed herein. Specifically, in FIG. 2A magnetometer measurements 200 show how a total magnetic field vector B is geometrically defined, while in FIG. 2B accelerometer measurements 201 show how a total gravity vector G is geometrically defined. As noted previously, total magnetic field B and total gravity G may represent measurements obtained using an MWD tool. Specifically, the raw axial measurements from the MWD tool for a magnetometer (magnetometer measurements 200) and for an accelerometer (accelerometer measurements 201) may be obtained and used for adaptive quality control for monitoring wellbore drilling, as will be described in further detail below. The Cartesian-coordinate vector diagrams shown in FIGS. 2A and 2B define an XYZ coordinate space that may be used to define space with respect to borehole 106 during drilling.

In particular, magnetometer measurements 200 and accelerometer measurements 201, although generally valid as shown for any orientation, are depicted for the special case of straight vertical drilling. Accordingly, for straight vertical drilling, a positive Z-axis points into the wellbore direction, while the XY axes define an XY plane perpendicular to the wellbore direction along the Z-axis. Also, for straight vertical drilling, axial component vector $B_z$ may be referred to as $B_{vertical}$, while vector $B_{xy}$ may be referred to as $B_{horizontal}$. As shown in FIGS. 2A and 2B, a positive X axis is aligned with the geographic north direction, a negative X axis is aligned with the geographic south direction, a positive Y axis is aligned with the geographic west direction, and a negative Y axis is aligned with the geographic east direction. It will be understood that such orientations and polarities may be arbitrary and may be modified in different embodiments or for different orientations of borehole 106.

During drilling, as drill string 146 is caused to rotate, downhole tool 166 (i.e., MWD tool also rotates in the XY plane, while motion along the Z-axis may remain relatively steady, according to the ROP. The MWD tool may include a 3D magnetometer that measures and outputs axial components $B_x$, $B_y$, $B_z$ of total magnetic field B, as well as a 3D accelerometer that measures and outputs axial components $G_x$, $G_y$, $G_z$ of total gravity G. Based on these raw measurements, an inclination angle and an azimuth angle of the bottom hole assembly (BHA) can be calculated in, order to determine a location and orientation of borehole 106 at a given well depth. Therefore, the accuracy of the measured quantities for B and G may be critical for determining the location and orientation of borehole 106.

In FIG. 2A, magnetometer measurements 200 depict to Cartesian coordinate space about an origin 210. For example, origin 210 may represent a current location of the BHA as a reference point for magnetometer measurements 200. From origin 210, magnetometer measurements 200 define the axial components $B_x$, $B_y$, $B_z$ of total magnetic field b. Also defined by magnetometer measurements 200 is a vector $B_{xy}$ that is the sum of axial components $B_x$ and $B_y$, and which also defines a magnetic dip angle $\varphi$ and a declination angle $\theta$.

In FIG. 2B, accelerometer measurements 201 depict a Cartesian coordinate space about origin 210. For example, origin 210 may represent a current location of the BHA as reference point for accelerometer measurements 201. From origin 210, accelerometer measurements 201 define the axial components $G_x$, $G_y$, $G_z$ of total gravity G.

Given the vectors $G=\{G_x,G_y,G_z\}$ and $B=\{B_x,B_y,B_z\}$, where the subscripts denote axial components and boldface denotes a vector quantity, Equations 1, 2, and 3 below define the quantities of B, G, and magnetic dip angle $\varphi$.

$$|G| = \left|\sqrt{G_x^2 + G_y^2 + G_z^2}\right| \quad \text{(Equation 1)}$$

$$|B| = \left|\sqrt{B_x^2 + B_y^2 + B_z^2}\right| \quad \text{(Equation 2)}$$

$$\varphi = \sin^{-1}\left(\frac{G \cdot B}{|G| \cdot |B|}\right) \quad \text{(Equation 3)}$$

The quantities $|B|$, $|G|$, and $\varphi$ from Equations 1-3, respectively, can be compared with reference values to calculate corresponding residual values. Then, using characteristic values indicative of instrument performance (i.e., MWD tool codes, or more generally, an instrument performance model, such as specified by tool codes) adaptive QC criteria for the MWD tool may be determined. In other words, for a downhole survey that fails QC, the raw measurements from the MWD tool are highly unlikely to fulfill the specifications of the MWD tool codes. More specifically, a failed QC evaluation may indicate that the calculated residual values exceed QC thresholds derived from the MWD tool codes, as will now be described in further detail.

An instrument performance model may incorporate certain assumptions about sources of error. The instrument performance model may be used in the form of coefficients (also referred to as "tool code error coefficients" or simply "tool codes") that describe different error sources. For example, the sources of error in MWD tool codes may be responsible for related errors in $|B|$, $|G|$, and $\varphi$. Thus, for the MWD tool codes, which quantifies the error sources, the resulting errors in $|B|$, $|G|$, and $\varphi$ can be computed. Table 1 below shows which tool code error coefficients influence which error sources in the QC parameters for an MWD tool. The values in Table 1 may be assumed to be given values and may be used as input values for the subsequent operations using a covariance matrix, as explained in further detail below.

TABLE 1

Tool code error coefficients for various error sources.

| Error Source | \|G\| | \|B\| | φ |
|---|---|---|---|
| Reference model | AFI | MFI | MDI |
| Accelerometer bias | AB | | AB |
| Accelerometer scale factor | AS | | AS |
| Magnetometer bias | | MB | MB |
| Magnetometer scale factor | | MS | MS |
| Axial interference | | AMIL | AMIL |

Covariance Matrix

The tool code error coefficients in Table 1 may be used to calculate the terms of a first covariance matrix for a single MWD survey. Equation 4 specifies a first covariant matrix $S_1$, while Equations 5 through 10 describe the calculation of the matrix elements in terms of the intermediate values that depend on the coefficients in Table 1.

$$S_1 = \begin{bmatrix} \delta G^2 & \delta G \delta B & \delta G \delta \varphi \\ \delta G \delta B & \delta B^2 & \delta G \delta \varphi \\ \delta G \delta \varphi & \delta B \delta \varphi & \delta \varphi^2 \end{bmatrix} \quad \text{(Equation 4)}$$

Elements in the Covariance Matrix

The calculation of the elements of the covariance matrix $S_1$ is given in Equations 5 through 10 in terms of various intermediate values (i.e., error terms) related to the coefficients in Table 1.

$$\delta G^2 = GT0 + GT1 + GT2 \quad \text{(Equation 5)}$$

$$\delta B^2 = BT0 + BT1 + BT2 + BT3 \quad \text{(Equation 6)}$$

$$\delta \varphi^2 = DIP0 + DIP1 + DIP2 + DIP3 + DIP4 + DIP5 \quad \text{(Equation 7)}$$

$$\delta G \delta B = 0 \quad \text{(Equation 8)}$$

$$\delta G \delta \varphi = (GT1/DIP5) + (GT2/DIP6) \quad \text{(Equation 9)}$$

$$\delta B \delta \varphi = (BT1/DIP1) + (BT2/DIP2) + (BT3/DIP4) \quad \text{(Equation 10)}$$

The formulas for calculating the intermediate values in Equations 5 through 10 will now be described. The convention used to name the intermediate values herein is $GT_n$ for $|G|$, $BT_n$ for $|B|$, and $DIP_n$ for $\varphi$, where n is a non-negative integer.

G Error Estimates

GT0; The reference error in G is a constant value of coefficient AFI=0.016 m/s² in Table 1 that may be determined as the RMS difference between the Global Acceleration Reference Model (GARM 2013) and normal gravity of 9.80655 m/s² for a global average down to 8000 m depth, as given by Equation 11.

$$GT0 = AF1 = 0.016 \frac{m}{s^2} \qquad \text{(Equation 11)}$$

GT1: An accelerometer bias (also referred to as an offset, drift, or intercept) represents a constant offset that distorts a true value to appear as a measurement value. Accordingly, for $G_x$ the bias term is given by Equation 12.

$$G_x^{true} = G_x^{measured} - GT1 \qquad \text{(Equation 12)}$$

In Equation 5, $G_x^{measured}$ is a measured value for $G_x$, and $G_x^{true}$ is a true value for $G_x$, while GT1 (also referred to as $\delta G_x$) may be obtained from coefficient AB for accelerometer bias in Table 1 as the value $AB^2$, as given by Equation 13. It is noted that similar equations apply for the Y and Z axes. Furthermore, it may be assumed that all axial accelerometer biases are equal to enable calculation of $G_y^{true}$ and $G_z^{true}$.

$$GT1 = AB^2 \qquad \text{(Equation 13)}$$

GT2: The intermediate value GT2 is given by Equation 14 terms of the coefficient AS in Table 1.

$$GT2 = \frac{AS^2}{|G|^2}(G_x^4 + G_y^4 + G_z^4) \qquad \text{(Equation 14)}$$

B Error Estimates

BT0: The reference error in b is the coefficient MFI in Table 1 as given by Equation 15.

$$BT0 = MFI \qquad \text{(Equation 15)}$$

BT1: the calculations for BT1 are substantially similar to GT1 except for application to the vector B and using the coefficient in Table 1 MB for magnetometer bias instead of AB for accelerometer bias, as given by Equation 16.

$$BT1 = MB^2 \qquad \text{(Equation 16)}$$

BT2: The calculations for BT1 are substantially similar to GT1 except for application to the vector B and using the coefficient in Table 1 MS for AS for accelerometer scale, as given by Equation 17.

$$BT2 = \frac{MS^2}{|G|^2}(G_x^4 + G_y^4 + G_z^4) \qquad \text{(Equation 17)}$$

BT3: To the calculation of BT3, an additional bias term in the along-hole z direction appears, and BT3 is calculated using the coefficient in Table 1 AMIL for axial interference, as given by Equation 18.

$$BT3 = \frac{B_z^2}{|B|^2} AMIL^2 \qquad \text{(Equation 18)}$$

$\varphi$ Error Estimates

DIP0: The reference error in $\varphi$ is the coefficient MDI in Table 1 as given by Equation 19.

$$DIP0 = MDI \qquad \text{(Equation 19)}$$

DIP1: The error term DIP1 is given in terms of the coefficient MB for magnetometer bias in Table 1 as given by the Equation 20.

$$DIP1 = \frac{MB^2}{|G|^2|B|^6(1-(g\cdot b)^2)}\Big((|B|^2 G_x - (G\cdot B)B_x)^2 + \\ (|B|^2 G_y - (G\cdot B)B_y)^2 + (|B|^2 G_z - (G\cdot B)B_z)^2\Big) \qquad \text{(Equation 20)}$$

In Equation 20, the quantity $(g\cdot b)$ is defined as given by Equation 21.

$$(g\cdot b) = \frac{G\cdot B}{|G|\cdot|B|} \qquad \text{(Equation 21)}$$

DIP4: The error term DIP4 is given in terms of the coefficient AB for accelerometer bias in Table 1 as given by Equation 22, in which certain terms for G and B are exchanged and Equation 21 yields the quantity $(g\cdot b)$.

$$DIP4 = \frac{AB^2}{|G|^2|B|^6(1-(g\cdot b)^2)}\Big((|G|^2 B_x - (G\cdot B)G_x)^2 + \\ (|G|^2 B_y - (G\cdot B)G_y)^2 + (|G|^2 B_z - (G\cdot B)G_z)^2\Big) \qquad \text{(Equation 22)}$$

DIP2: The error term DIP2 is given in terms of the coefficient MS for magnetometer scale in Table 1 as given by Equation 23, while Equation 21 yields the quantity $(g\cdot b)$.

$$DIP2 = \frac{MS^2}{|G|^2|B|^6(1-(g\cdot b)^2)}\Big(B_x^2(|B|^2 G_x - (G\cdot B)B_x)^2 + \\ B_y^2(|B|^2 G_y - (G\cdot B)B_y)^2 + B_z^2(|B|^2 G_z - (G\cdot B)B_z)^2\Big) \qquad \text{(Equation 23)}$$

DIP5: The error term DIP5 is given in terms of the coefficient MS for magnetometer scale in Table 1 as given by Equation 24, which is similar to Equation 23, but with certain values for G and B exchanged and using MS instead of AS, while Equation 21 yields the quantity $(g\cdot b)$.

$$DIP5 = \frac{MS^2}{|G|^2|B|^6(1-(g\cdot b)^2)}\Big(G_x^2(|G|^2 B_x - (G\cdot B)G_x)^2 + \\ G_y^2(|G|^2 B_y - (G\cdot B)G_y)^2 + G_z^2(|G|^2 B_z - (G\cdot B)G_z)^2\Big) \qquad \text{(Equation 24)}$$

DIP3: The error term DIP3 is given in terms of the coefficient AMIL for axial interference in Table 1 as given by Equation 25, while Equation 21 yields the quantity $(g\cdot b)$.

$$DIP3 = \frac{AMIL^2}{|G|^2|B|^6(1-(g\cdot b)^2)}(|B|^2 G_z - (G\cdot B)B_z)^2 \quad \text{(Equation 25)}$$

Generalized Covariance Matrix for sets of Surveys of all Types

A generalized method, similar to the first covariance matrix, may be used in order to produce a second covariance matrix $S_2$ that describes a set of surveys for a given well, or a number of survey legs comprising some number of wells. Second covariance matrix $S_2$ may be impacted by an arbitrary number of errors sources, some of which may be correlated across some or all of the surveys based on which leg or which well the surveys belong to.

A general reference quality, R, of known value is considered, which may be, B, G, magnetic dip angle φ, or another reference value, where a residual value will be used to measure the quality of a survey point. A set of surveys may then be associated with a collection of residual values determined by subtracting measured values of R from associated theoretical quantities related to R.

A design matrix A can be constructed using the partial derivatives of the reference value R with respect to an error source r for each measurement of the reference criteria. For a set of n reference measurements that may be corrupted by m different error sources, each error source having a respective magnitude of $\varepsilon_i$, the design matrix A may be is defined as given in Equation 26.

$$A = \begin{bmatrix} \varepsilon_1 \frac{\partial R_1}{\partial \varepsilon_1} & \cdots & \varepsilon_1 \frac{\partial R_n}{\partial \varepsilon_1} \\ \vdots & \ddots & \vdots \\ \varepsilon_m \frac{\partial R_1}{\partial \varepsilon_m} & \cdots & \varepsilon_m \frac{\partial R_n}{\partial \varepsilon_m} \end{bmatrix} \quad \text{(Equation 26)}$$

It is noted that in design matrix A, globally propagated errors may appear as a single error source, well level errors may be included once for each well to which the well level errors apply, systematic errors may be included once for each survey leg to which the systematic errors apply, and random errors may be included once for each survey to which the random errors apply.

After computing design matrix A, second covariant matrix $S_2$ may be computed as a generalized error covariance matrix using, cross multiplication of design matrix A. Second covariant matrix $S_2$ may have n×n elements and may relate the expected errors in any reference quantity for any particular survey to the same errors in any other reference quantity in any other survey. Second covariant matrix $S_2$ is given by Equation 27.

$$S_2 = A^T A = \begin{bmatrix} \delta R_1^2 & \cdots & \delta R_1 \delta R_n \\ \vdots & \ddots & \vdots \\ \delta R_n \delta R_1 & \cdots & \delta R_n^2 \end{bmatrix} \quad \text{(Equation 27)}$$

Evaluating QC Criteria from Multiple Surveys

As described with respect to method 300-1 (see FIG. 3), an error covariance matrix $S_1$ was used for each individual survey station using the error sources identified in instrument tool codes, in a further aspect, a determination may be made whether the errors in a new survey station are consistent with the errors observed in prior survey stations along the same borehole. The determination may also evaluate whether the errors from a group of survey stations are, when taken together, acceptable based on error values, in this manner, a criterion may be developed to generate new it from a survey station that may indicate QC escalation of a set of surveys for review by an expert. In other words, it may be determined whether the new errors in a survey are consistent or not with errors from one or more previous surveys, such as surveys for the same borehole, among other different kinds of surveys.

In this regard, a criterion may be generated for whether a survey set, (i.e., a plurality of surveys) when taken as a whole, indicates escalation for review by an expert, for example, for having errors not consistent with, reference error values and not consistent with error sources included in the MWD tool codes (see Table 1).

It is noted that any so-called "escalation criteria" may be considered a decision point for an automated drilling system, because an automated system may be enabled to evaluate the escalation criteria and perform the escalation, when indicated.

Accordingly, second covariance matrix $S_2$ may be generated for a set of several surveys defined through the propagation modes in the error values, as described previously. The second covariance matrix $S_2$ for the set of surveys may describe how errors in one survey affect errors in a different survey within the set of surveys. For example, the set of surveys may include surveys within, the same bore hole that are made using the same MWD surveying tool. However, second covariance matrix $S_2$ may be generated for surveys taken by differing survey instruments, or even surveys in different boreholes, because the relationships between varying elements can be derived from the tool codes used to perform the various surveys. Accordingly, more than one tool code error value or more than one borehole may form the basis for second covariance matrix $S_2$ for the set of surveys.

Second covariance matrix $S_2$ for the set of surveys may provide a method applicable to notional future surveys that have not been measured yet, but have a theorized orientation that can be used in conjunction with the error values. Once second email alto; matrix $S_2$ is constricted, set of surveys can be evaluated by computing a Mahalanobis distance for the measured values of the QC criteria for all surveys. The Mahalanobis distance can be used to determine the probability that a survey tool that meets error expectations produces the measured values (a P-value).

When only some of the surveys have been measured (but some are notional future surveys), the values of the measured surveys can be used to produce a second covariance matrix $S_2$ that reduces the acceptable QC range for the future surveys based on what has already been, measured. The second covariance matrix $S_2$ can be used to calculate a conditional Mahalanobis distance, which may enable acceptance or rejection of the new survey data in the context of the previous data.

Furthermore, tolerances may be defined (e.g., by a user) for both the overall probability (P-value) as well as the conditional Mahalanobis distance (marginal sigma) that enable automated acceptance or rejection of surveys by a non-expert user, or by an automated drilling system. The acceptance/rejection criteria can be used to construct a more accurate wellbore, or to alert an expert user that detailed evaluation is indicated.

The QC method involving second covariance matrix $S_2$ for the set of surveys can be used in conjunction with surveys intended for a collision avoidance scan such that a user may be alerted to a potential failure of surveys to accurately convey a risk of a borehole collision.

Computed Covariance Matrix $S_1$, and Derived Quantities, Computed from Error Values Every survey station along the well trajectory may be associated with a different covariance matrix $S_1$, due to the changing orientation of the wellbore. So, for every survey station, the elements of covariance matrix $S_1$ may be computed using Equations 4 through 25 given above, as indicated. After calculation of the covariance matrix $S_1$, the following matrices can be computed: an inverse of covariance matrix $S_1$; an eigenvector decomposition of the covariance matrix $S_1$; a root of the covariance matrix; an inverse of the root of the covariance matrix; a minimum intersection, with axis, and maximum, of the 1-sigma ellipsoid with the three coordinate system axes for B, G, magnetic dip angle $\varphi$. These matrices may be used tri compute QC criteria and display the QC criteria in various different kinds of plots. In various implementations, the following inputs may be used for computations: tool code error coefficients, wellbore inclination angle, wellbore azimuth angle, gravity reference field, and magnetic reference field; while the following output values may be calculated: a covariance matrix, an inverse covariance matrix, a root covariance matrix, an inverse root covariance matrix, a projection of an ellipsoid onto a 3 coordinate system axes, a minimum in sector, and a maximum in sector.

Computing Statistical Distances and Ranges for a Set of MWD Surveys

For a given set of QC parameter residual values dB, dG and d$\varphi$, additional computations may be performed, such as statistical distances and ranges for a set of MWD surveys.

Statistical Distance: The statistical distance of a given set of residuals given by a vector r={dB, dG, d$\varphi$} is computed as given by Equation 28.

$$\text{Statistical Distance} = \sqrt{r^t \text{cov}^{-1} r} \quad \text{(Equation 28)}$$

Residual Statistical Distances: The separate residual statistical distances corresponding to the individual B, G and $\varphi$ axes may be calculated as projections on a given axis.

Outer Error Bounds: The outer error bounds represent maximum values for the 3 axes (B, G and $\varphi$) of an outer bounding of the ellipsoid, which is unambiguous. Because the maximum values lie at an extreme point on the ellipsoid, the maximum value may be determined by setting the derivative of a parameterization to zero and solving for respective values of (B, G and $\varphi$).

Inner Error Bounds: The inner error bounds represent minimum values for the 3 axes (B, C and $\varphi$) of an inner bounding box of the ellipsoid. In contrast to the outer bounding box, there may be ambiguity in defining an inner bounding box because of sectors in which one of the (B, G and $\varphi$) may dominate. For this purpose, sectors may be defined as lines through the ellipsoid and used for calculation of the inner error bounds by using a root of the covariance matrix. Scaling by the sigma values instead of the diagonals of the root of the covariance matrix may also be used.

After two or more surveys in a set have been collected and associated residual values have been computed, the known covariance between the surveys in the set and future surveys can be used to further reline the expected errors in future measurements. The procedure is similar to that described above with covariant matrix $S_2$, but involves replacing covariant matrix with a new covariant matrix $S_3$ that may be a conditional covariance matrix. It is noted that similar or equivalent types of displays and user interfaces used with covariant matrix $S_1$ may be generated using covariant matrices $S_2$ and $S_3$.

Starting from generalized covariant matrix $S_2$ having n×n elements, once k number of measurements have been collected, partition matrix $S_2$ to generate a partitioned matrix $S_3$ having the following sub-matrices; 1) $\Sigma_k$—an error covariance sub-matrix having k×k elements and containing the relations of reference measurements already collected; 2) $\Sigma_n$—a sub-matrix having (n–k)×(n–k) elements and containing the relations of measurements yet to be evaluated, and 3) $\Sigma_{kn}$ and $\Sigma_{nk}$—two sub-matrices, one having k×(n–k) elements, the other having (n–k)×k elements, that contain the relations between sub-matrices $\Sigma_k$ and $\Sigma_n$. The partitioned matrix S3 is given by Equations 29 and 30.

$$S_3 = \begin{bmatrix} \delta R_1^2 & \cdots & \delta R_1 \delta R_k & \delta R_1 \delta R_{k+1} & \cdots & \delta R_1 \delta R_n \\ \vdots & \ddots & \vdots & \vdots & \ddots & \vdots \\ \delta R_k \delta R_1 & \cdots & \delta R_k^2 & \delta R_k \delta R_{k+1} & \cdots & \delta R_k \delta R_n \\ \delta R_{k+1} \delta R_1 & \cdots & \delta R_{k+1} \delta R_k & \delta R_{k+1}^2 & \cdots & \delta R_{k+1} \delta R_n \\ \vdots & \ddots & \vdots & \vdots & \ddots & \vdots \\ \delta R_n \delta R_1 & \cdots & \delta R_n \delta R_k & \delta R_n \delta R_{k+1} & \cdots & \delta R_n^2 \end{bmatrix} \quad \text{(Equation 29)}$$

$$S_3 = \begin{bmatrix} \Sigma_k & \Sigma_{kn} \\ \Sigma_{nk} & \Sigma_n \end{bmatrix} \quad \text{(Equation 30)}$$

A conditional covariance for the remaining surveys, $\Sigma_{n,conditional}$ can be computed by taking $\Sigma_n$ and subtracting the variance that would be explained by the prior measurements, as given in Equation 31.

$$\Sigma_{n,conditional} = \Sigma_n - \Sigma_{nk} \Sigma_k^{-1} \Sigma_{kn} \ 9 \quad \text{(Equation 13)}$$

When evaluating a survey against the conditional covariance matrix $\Sigma_{n,conditional}$, the error residuals may no longer have a zero expectation as errors that are correlated between the two groups of surveys may be expected to persist. Evaluation of survey residuals may then be performed against a conditional center $\mu$ that can be computed using a 1×k sized vector of measured residuals, $R_k$ and the partitioned matrix components previously defined, as given in Equation 32.

$$\mu = \Sigma_{nk} \Sigma_k^{-1} R_k \quad \text{(Equation 32)}$$

Figure 3A:
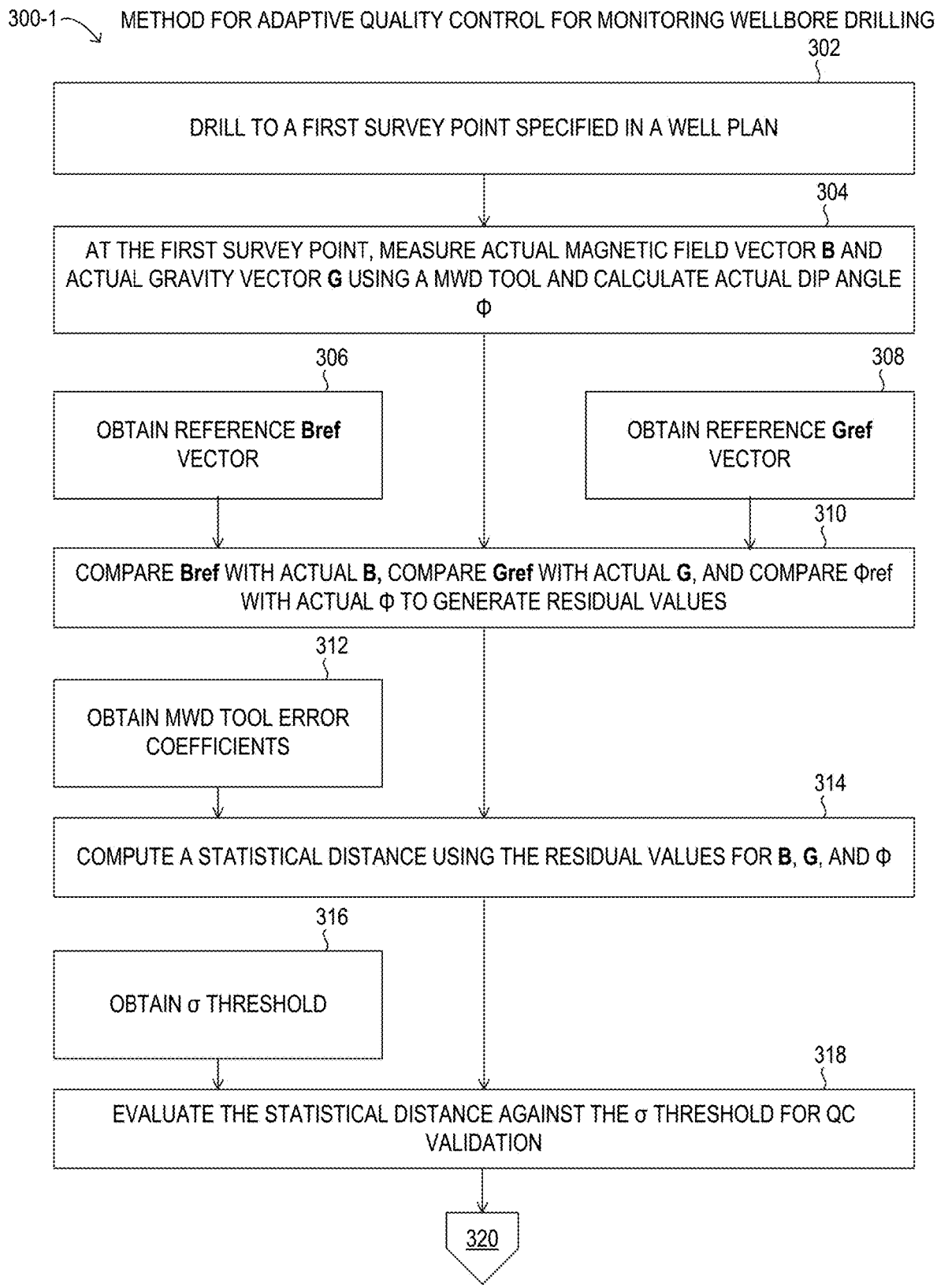
FIGS. 3A, 3B, 3C, and 3D depict selected elements of an embodiment of a method for adaptive quality control for monitoring wellbore drilling.
Figure 3B:
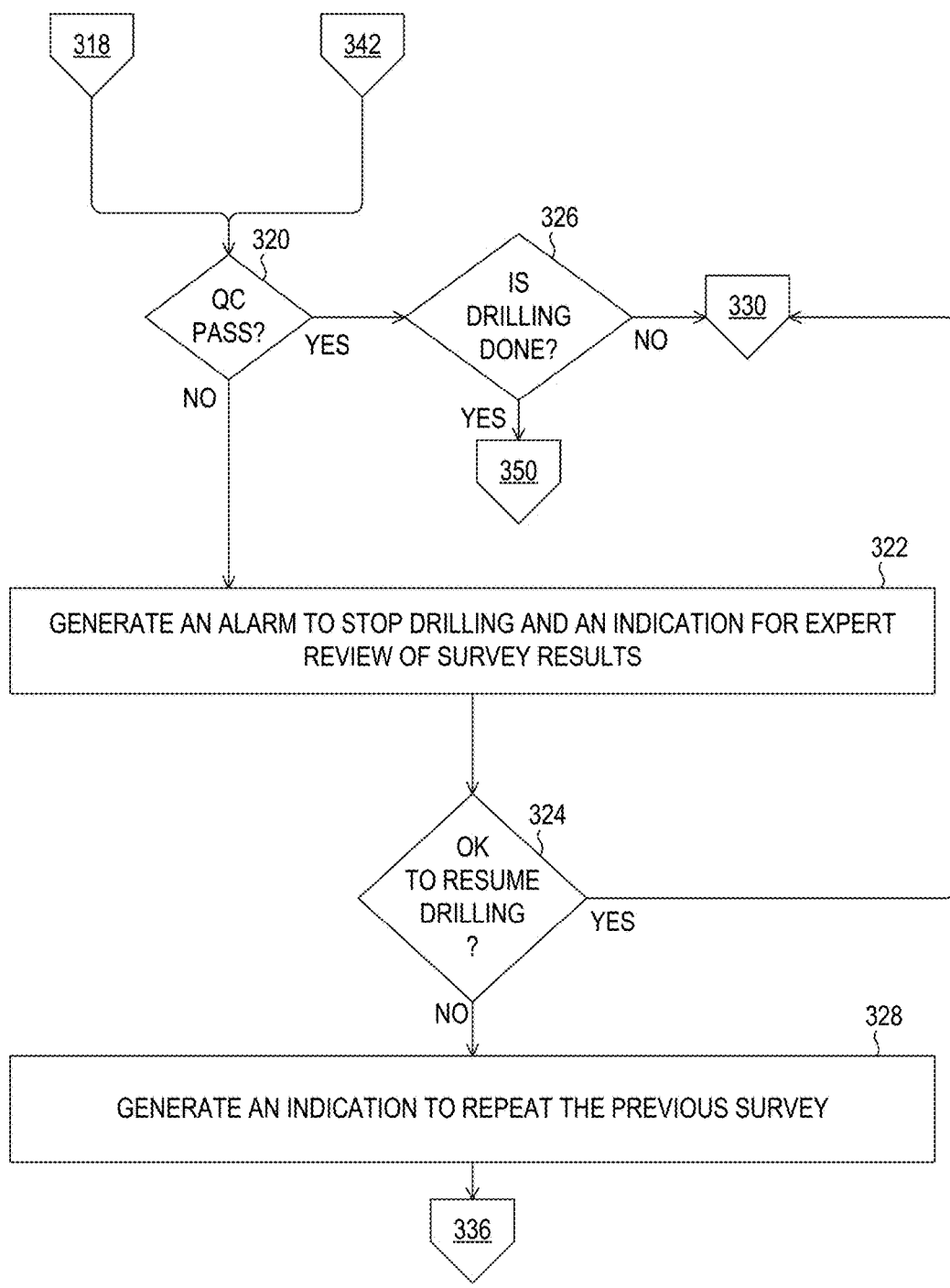
Figure 3C:
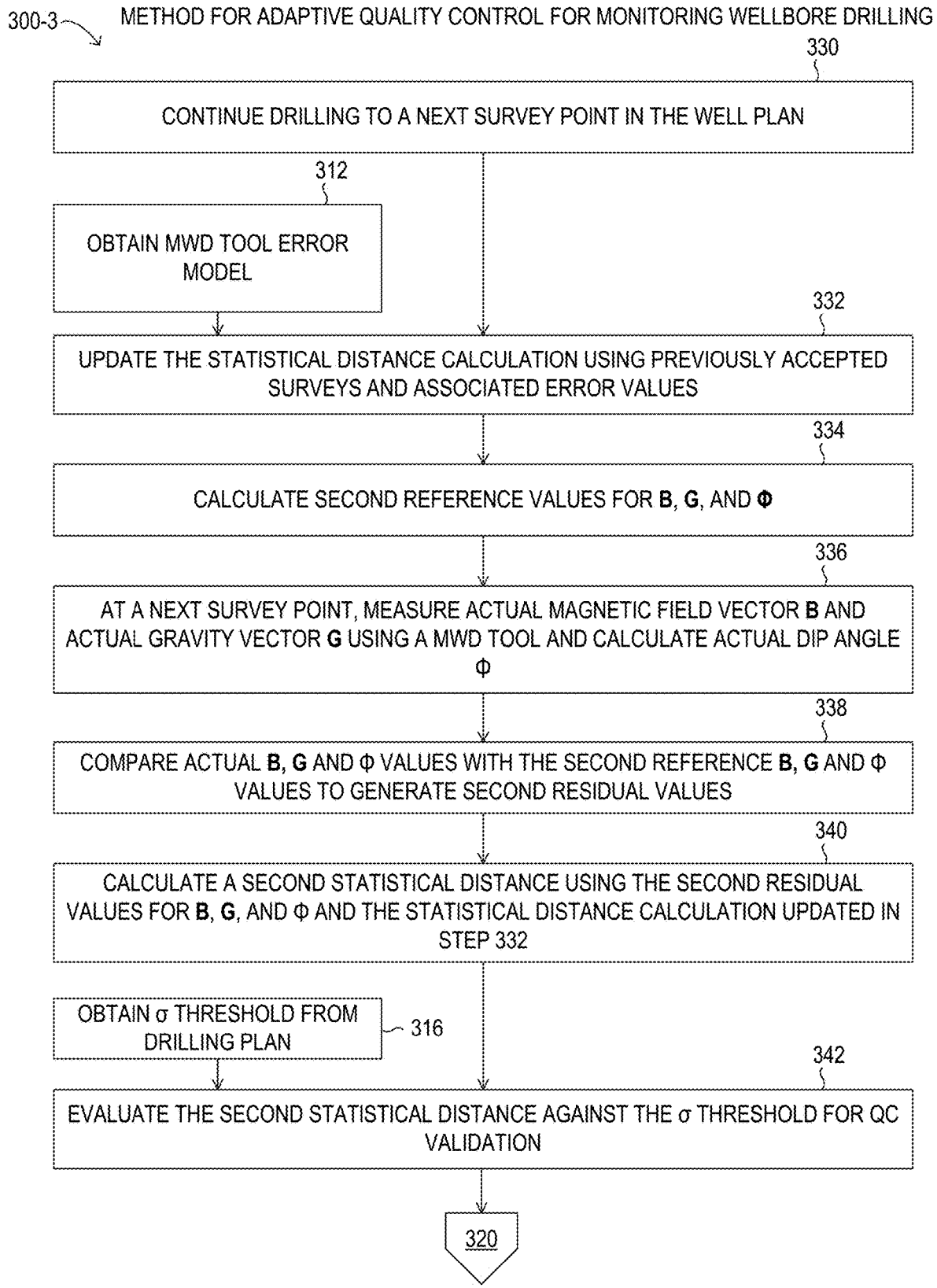
Figure 3D:
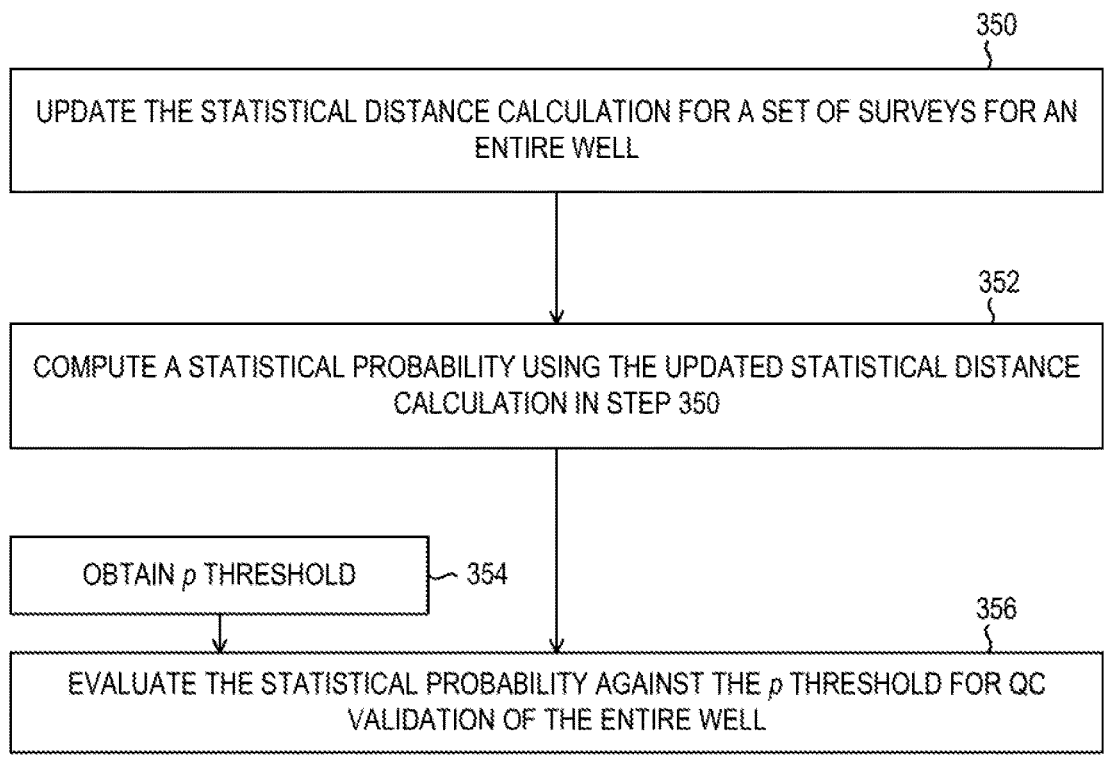

Referring now to FIGS. 3A, 3B, 3C and 3D, flowcharts of selected elements of an embodiment of a method 300 for adaptive quality control for monitoring wellbore drilling, as disclosed herein, is depicted. In FIG. 3A, method 300-1 comprising steps 302 through 318 describe a method of adaptive quality control on a single MWD survey. In FIG. 3B, method 300-2 comprising steps 320 through 328 describes additional operation for evaluating QC and generating an alarm to indicate that drilling should stop. In FIG. 3C, method 300-3 comprising steps 330 through 342 describes a method of adaptive quality control on multiple MWD surveys. In FIG. 3D, method 300-4 comprising steps 350 through 356 describes a method of adaptive quality control on MWD surveys for an entire well. Method 300-4 may be performed after drilling of the well is complete, or may be performed during drilling of the well. It is noted that certain operations described in method 300 may be optional or may be rearranged in different embodiments.

Method 300-1, may begin in FIG. 3A, at step 302, by drilling to a first survey point specified in a well plan. At step

304, at the first survey point, an actual magnetic filed vector B and an actual gravity vector G are measured using a MWD tool and actual magnetic dip angle $\varphi$ is calculated. At step 306, a reference $B_{ref}$ vector are obtained. At step 308, a reference $G_{ref}$ vector are obtained. At step, 310 $B_{ref}$ is compared with actual B, $G_{ref}$ is compared with actual G, and $\varphi_{ref}$ is compared with actual $\varphi$ to generate residual values. It is noted that $\varphi_{ref}$ may be calculated using $B_{ref}$ and $G_{ref}$. At step 312, MWD tool error coefficients are obtained. At step 314, a statistical distance using the residual values for B, G, and $\varphi$ is computed. At step 316, a $\sigma$ threshold is obtained. At step 318, the statistical distance is evaluated against the a threshold for QC validation. After step 318, method 300-1 may proceed to method 300-2 in FIG. 3B.

Method 300-2, may begin in FIG. 3B, at step 320 (from either step 318 or step 342), by making a decision whether QC passed. When the decision in step 320 is YES and QC passed, at step 326, a decision is made whether drilling is done. When the decision in step 326 is NO and drilling is not done, method 300-2 may proceed to step 330. When the decision in step 326 is YES and drilling is done, method 300-2 may proceed to step 350. When the decision in step 320 is NO and QC failed, at step 322, an alarm to stop drilling and, an indication for expert review of survey results are generated. The alarm in step 322 may be a simple audio or visual indication. The alarm in step 322 may be a message to a control system of a drilling system to stop drilling. At step 324, a decision is made whether it is ok to resume drilling. When the decision in step 324 is YES and it is of to resume drilling, method 300-2 may proceed to step 330. When the decision in step 324 is NO and it is not ok to resume drilling, at step 328, an indication is generated to repeat the previous survey. After step 328, method 300-2 may proceed to step 336.

Method 300-3, may begin in FIG. 3C, at step 330 by continuing to a next survey point in the well plan. At step 312, MWD tool error coefficients are obtained. At step 332, the statistical distance calculation is updated using previously accepted surveys and associated error values. At step 334, second reference values for B, G and $\varphi$ are calculated. At step 336, at a next survey point, actual magnetic field vector B and actual gravity vector G are measured using an MWD tool and actual magnetic dip angle $\varphi$ is calculated. At step 338, actual B, G and $\varphi$ values are compared with the second reference B, G and $\varphi$ values to generate second residual values. At step 340, a second statistical distance is calculated using the second residual values for B, G and $\varphi$ and the statistical distance calculation updated in step 332. At step 316, a $\sigma$ threshold is obtained. At step 342, the second statistical distance is evaluated against the $\sigma$ threshold for QC validation.

Method 300-4, may begin in FIG. 3D, at step 350 by updating the statistical distance calculation for a set of surveys for an entire well. At step 352, a statistical probability is computed using the updated statistical distance calculation in step 350. At step 316, a p threshold is obtained. At step 356, the second statistical distance is evaluated against the p threshold for QC validation of the entire well.

Displaying the QC Criteria

Figure 4:
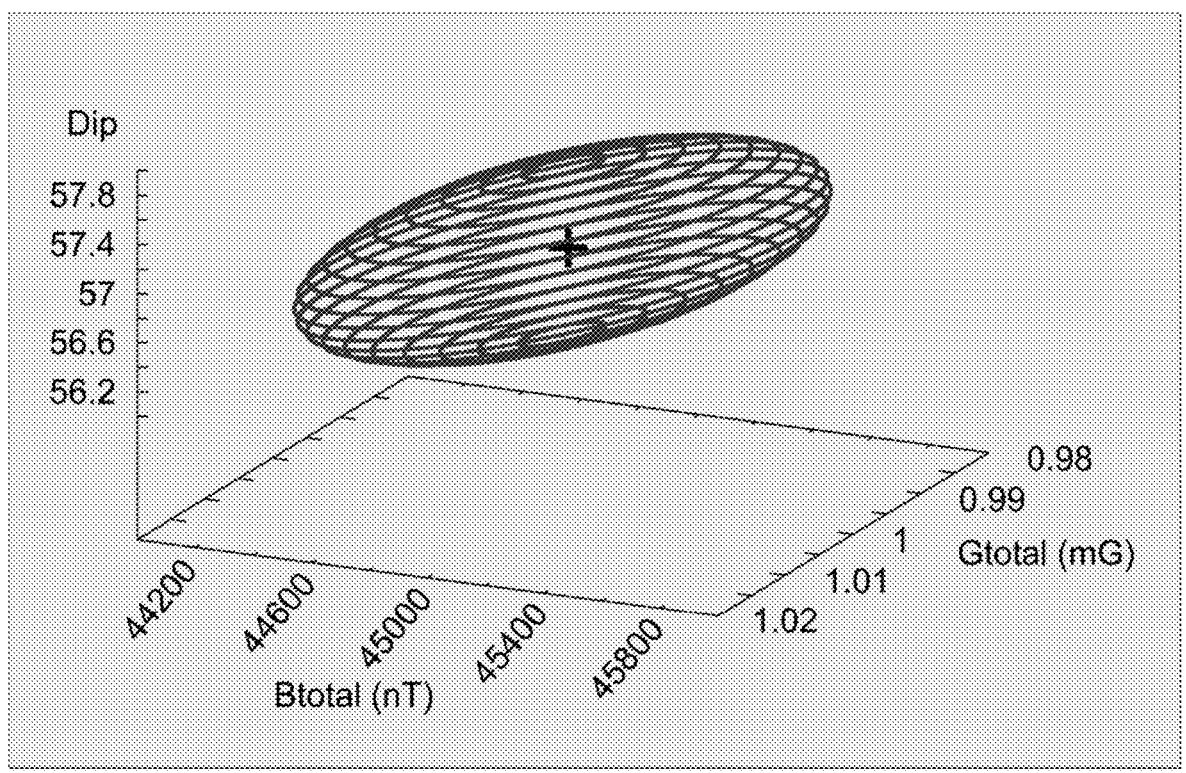
FIG. 4 depicts a QC threshold 3D ellipsoid depicting 2.8 sigma error.
Figure 5:
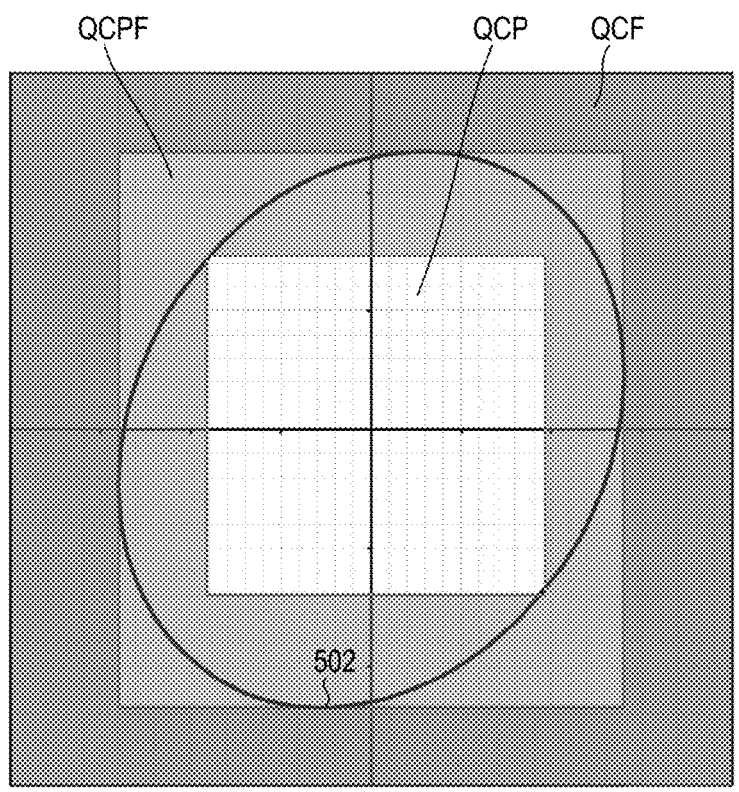
FIG. 5 depicts a QC threshold 3D ellipsoid with threshold regions overlaid thereon.

In FIGS. 4 through 11, 12A, and 12B, various user interface elements showing QC criteria and indications of QC results are depicted as may be displayed to a user. The display of the plots and graphs in FIGS. 4 through 11, 12A, and 12B may be generated for visualization and use by the user during drilling or for post-drilling analyses. As noted previously, QC criteria for (B, G and $\varphi$) may be mathematically illustrated as a 3D ellipsoid. As shown in FIG. 4, if a sigma value of 2.8 (95% confidence in 3D) is used to compute error ellipses for well planning, then any residual value vector of (dG, dB and d$\varphi$) that lies outside of 2.8 times the 1-sigma error ellipse can be considered to fail the QC criteria. However, while exact QC thresholds for parameters may not be definable, areas in 2D (or volumes in 3D) can be defined within which the survey may pass QC (QCP), may pass or fail QC (QCPF), or may fail QC (QCF), as shown in FIG. 5, which depicts a 2D projection of an ellipsoid 502, such as the ellipsoid shown in FIG. 4.

Figure 6:
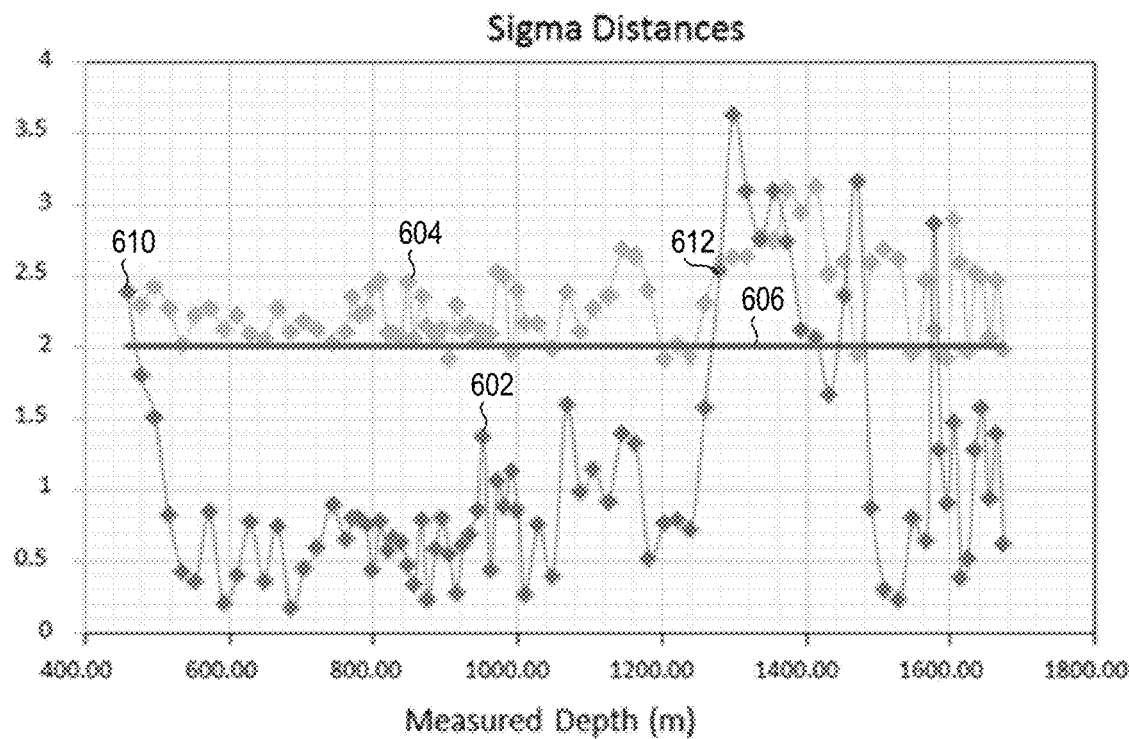
FIG. 6 is a plot showing statistical distance (sigma) as a function or measured depth along a wellbore.

Referring now to FIG. 6, a plot of overall statistical distances is shown. In FIG. 6, the statistical distance (or 3D sigma) as disclosed herein is shown. FIG. 6 shows an easy to understand display because a threshold line shows if the value is above or below a threshold value for the survey to fail QC. In FIG. 6, a dark plot 602 represents the second statistical distance described in method 300, while a light plot 604 represents the first statistical distance described in method 300. A constant 2$\sigma$ value is shown as a threshold line 606 for ease of evaluation. As is evident from FIG. 6, the use of multiple surveys and the second statistical distance results in improved QC for the same measurements.

Figure 7:
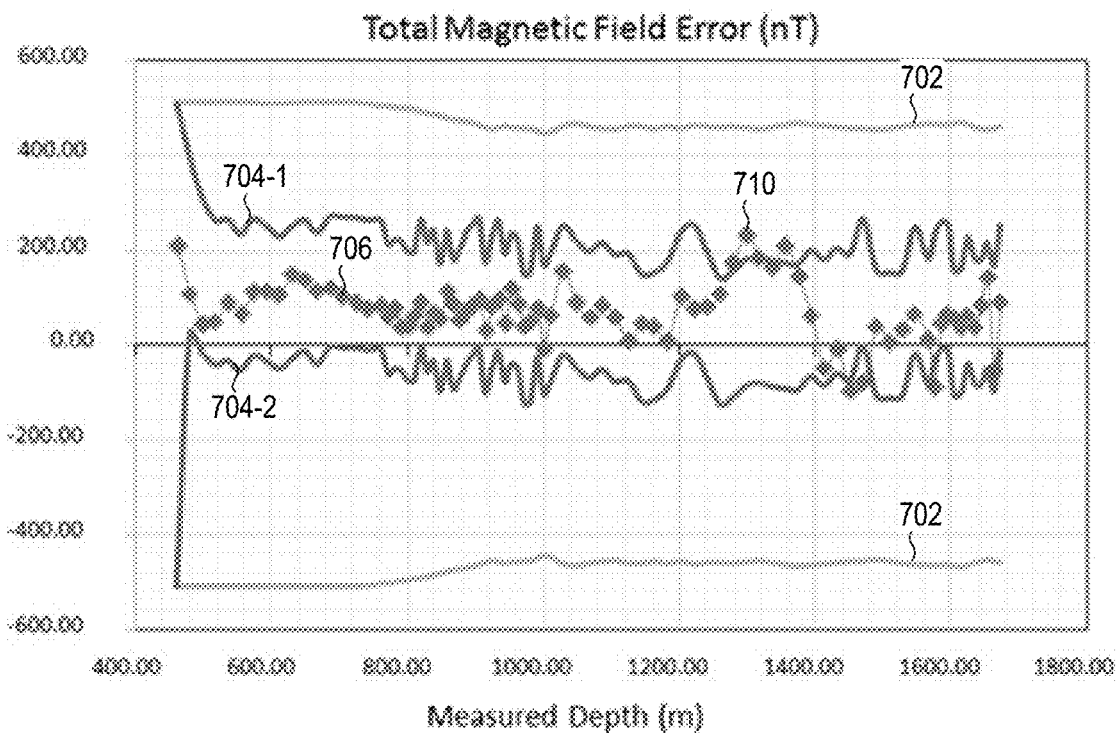
FIG. 7 is a plot showing residual value statistical distances as a function of measured depth along a wellbore for magnetic field strength B.
Figure 8:
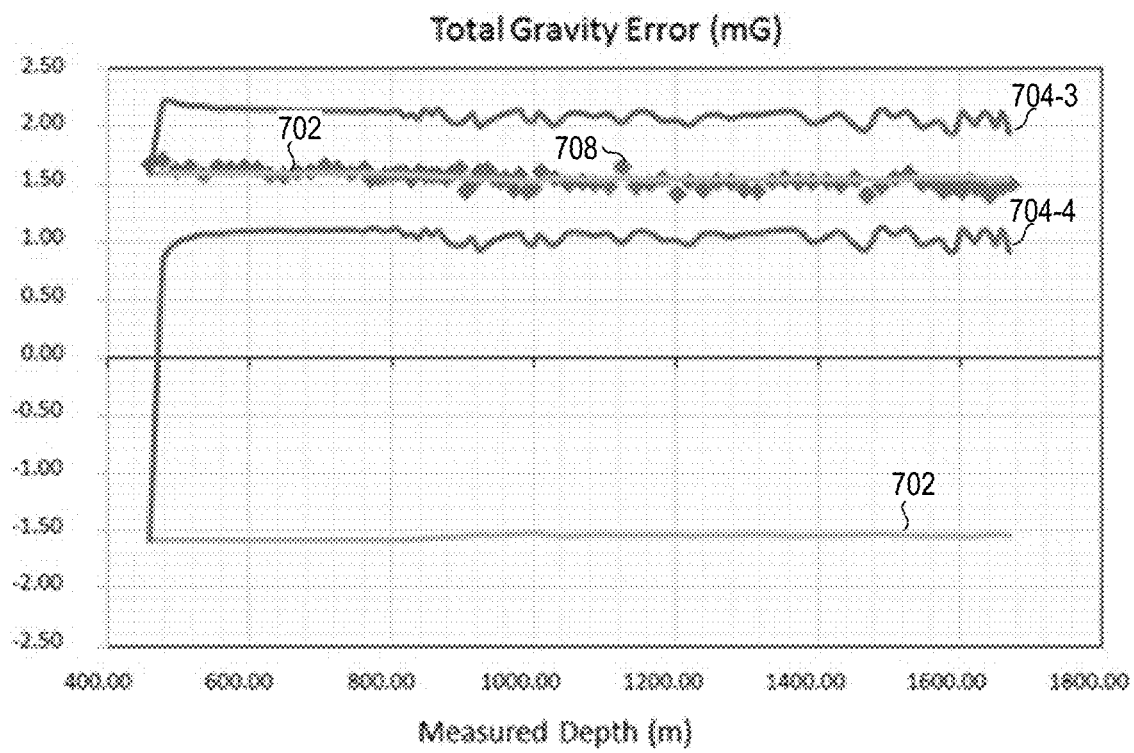
FIG. 8 is a plot showing residual value statistical distances as a function of measured depth along a wellbore for gravity field G.
Figure 9:
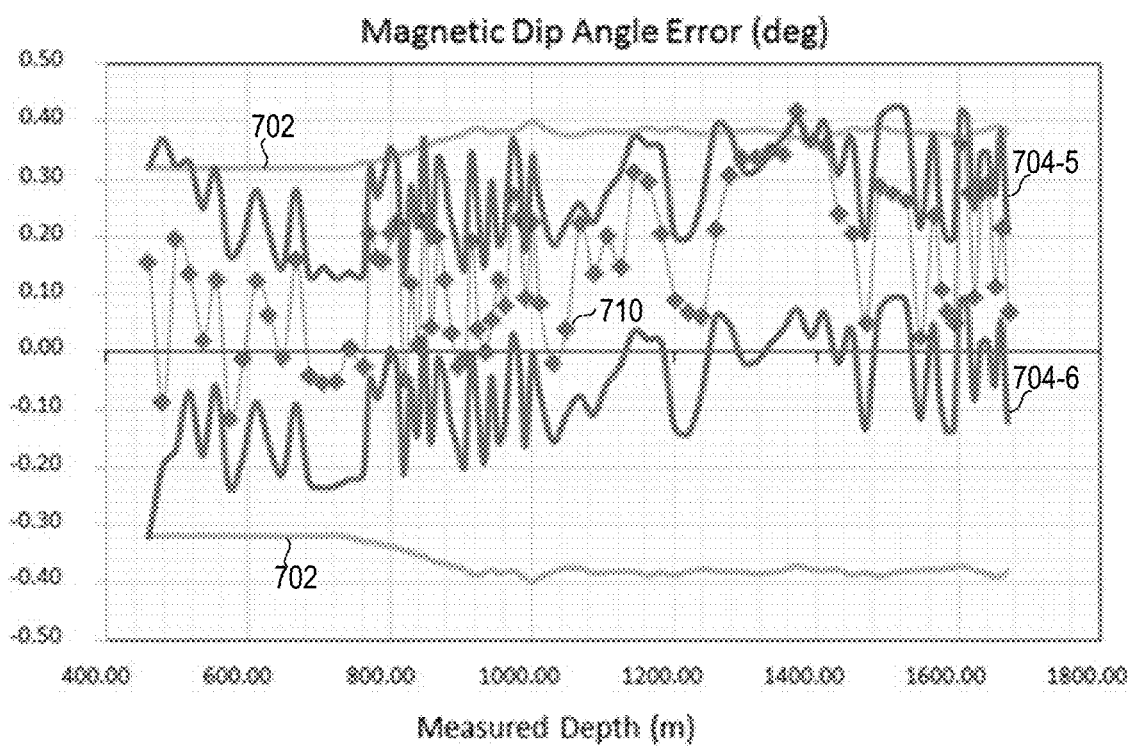
FIG. 9 is a plot showing residual value statistical distances as a function of measured depth along a wellbore for magnetic dip angle φ.

In FIGS. 7, 8, and 9, plots of residual distances along with certain QC thresholds are shown for B, G and $\varphi$ respectively. The plots in FIGS. 7-9 are for the same QC analysis as shown in FIG. 6 above. In FIGS. 7-9, a light line 702 are QC limits as calculated using a conventional method specified in Society of Petroleum Engineers (SPE) Publication No. 103734, a dark line 704 are QC limits as calculated using method 300-3 in FIG. 3C, while data points are the respective measurements (B 706 in FIG. 7; G 708 in FIG. 8, and $\varphi$ 710 in FIG. 9). It is noted that QC limits 702 are symmetrical and centered about zero, while QC limits 704 are adaptive and are not symmetrical and are not centered about zero.

Figure 10:
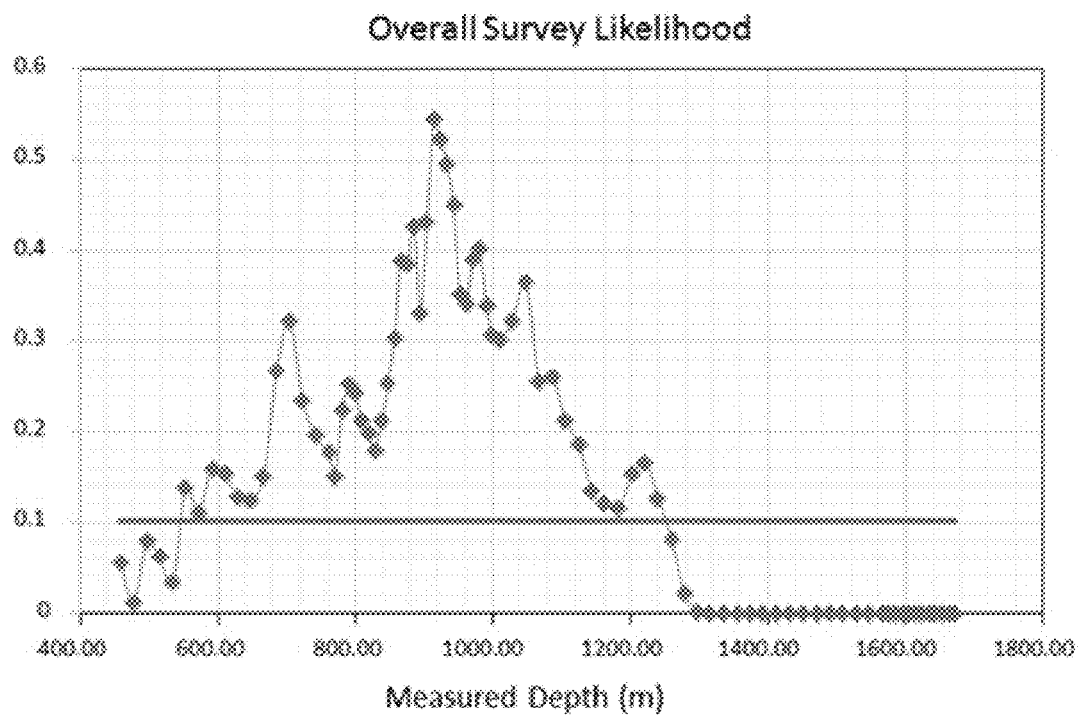
FIG. 10 is a plot showing statistical probability as a function of measured depth along a wellbore.

Referring now to FIG. 10, a plot of overall survey likelihood (probability) is shown. The plot in FIG. 10 is for the same QC analysis as shown in FIG. 6 above. In FIG. 10, a threshold line at 10% probability of a survey passing QC is used. FIG. 10 shows an easy to understand display because a threshold line shows if the value is above or below a threshold value for the survey to fail QC.

In FIGS. 6 through 10, a QC analysis during drilling of a wellbore is depicted and the individual data points each correspond to an MWD survey along the wellbore at the corresponding measured depth. For example, viewing FIG. 6 an overall description of the QC process may be better understood. After the first survey point 610 is taken, a QC fail result is generated that indicates drilling should stop. Then, upon further analysis, drilling is allowed to proceed and method 300-3 is used to correlate errors with previous surveys. As a result, the second statistical distance 302 falls below the 2$\sigma$ threshold and QC passes for all surveys until survey point 612 at about 1,300 m is performed that fails QC. Analysis of the individual residual value plots shows that the future of QC is due to increased error in magnetic field B, seen from data point 710 in FIG. 7. In particular, in FIG. 6, the comparison between first statistical distance 601 and second statistical distance 602 shows how adaptive QC can improve reliability of QC and prevent false positives that may indicate too many drilling stops, even when measurements are in fact acceptable.

Figure 11:
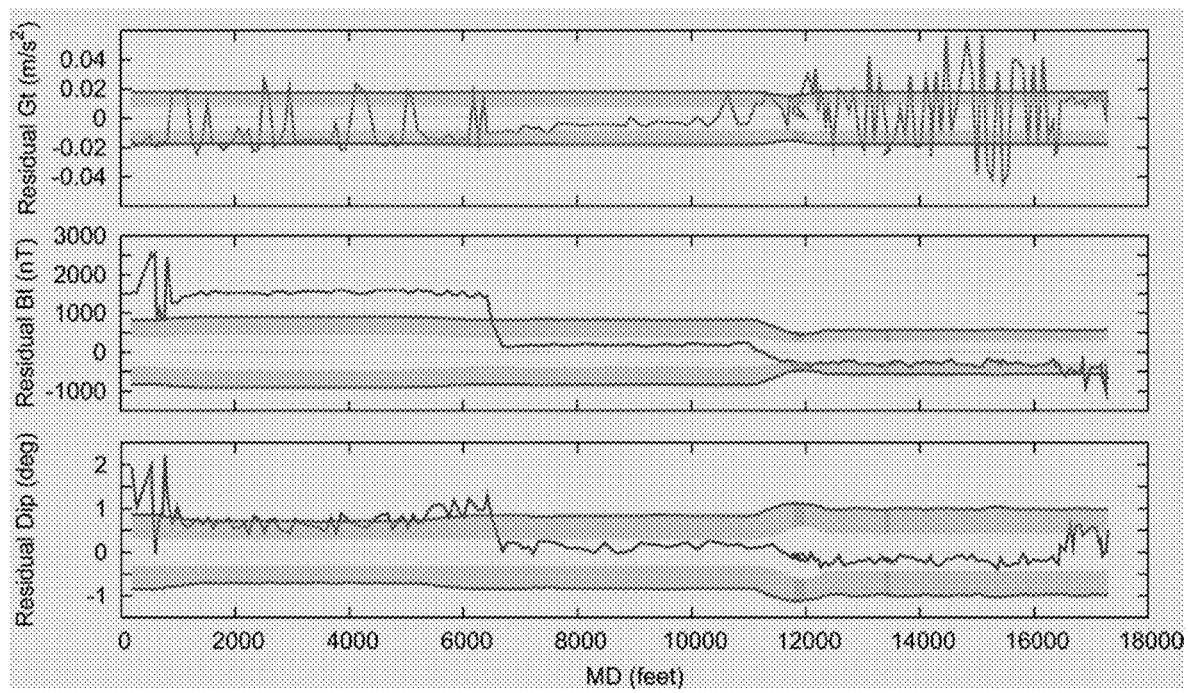
FIG. 11 shows three plots of residual values of B, G, and φ against adaptive QC thresholds versus measured depth.
Figure 12A:
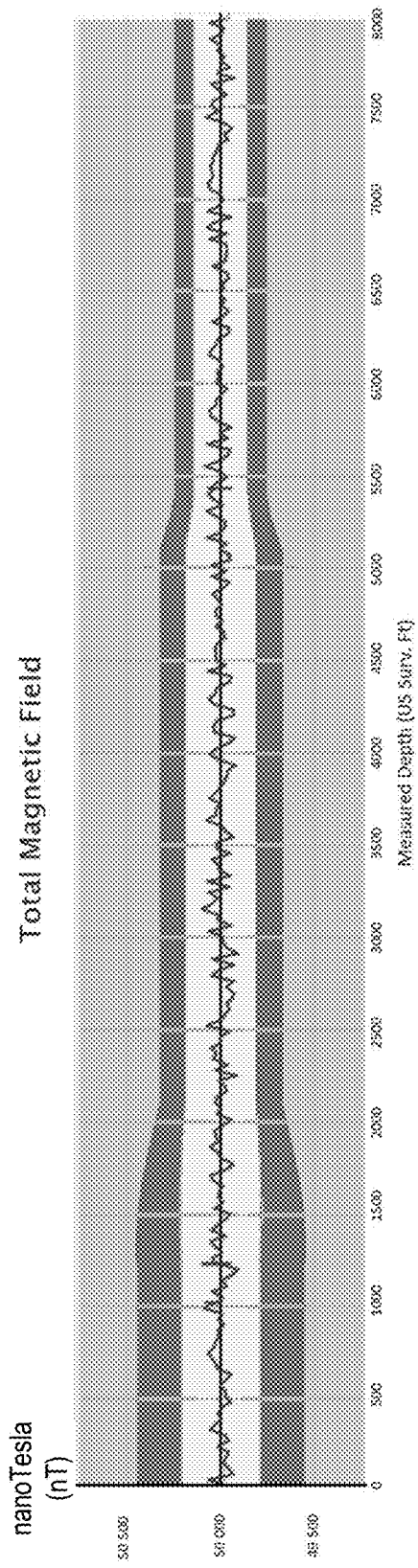
FIG. 12A shows a plot of actual values of B against adaptive QC thresholds versus measured depth.
Figure 12B:
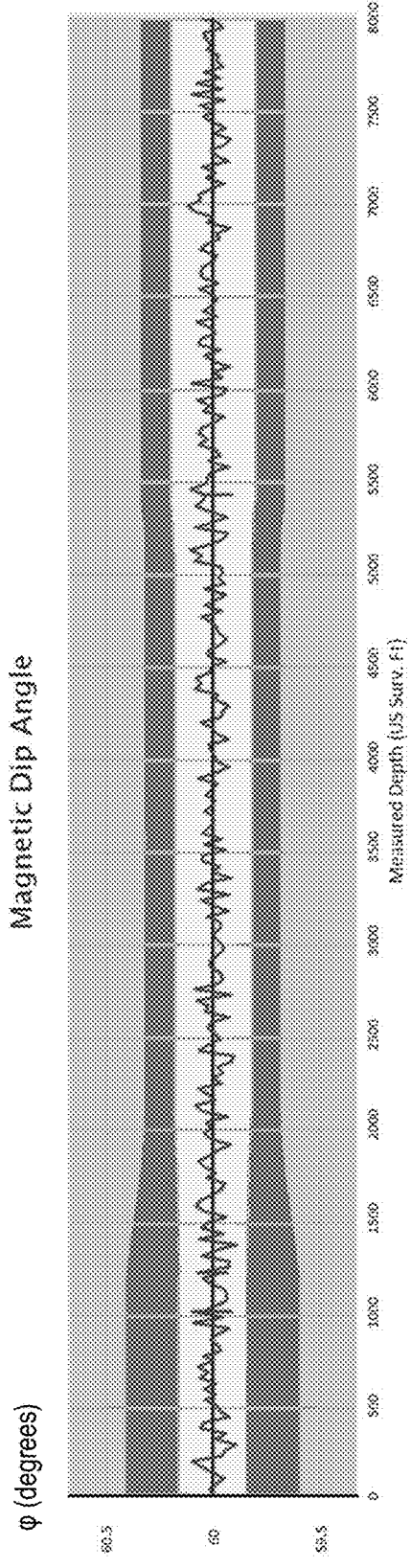
FIG. 12B shows a plot of actual values of φ against adaptive QC thresholds versus measured depth.

In FIG. 11, a display to a user is depicted in the form of residual value plots (e.g., centered about zero) for B, G and $\varphi$ respectively, along with respective adaptive QC criteria, such as may be calculated using covariant matrices $S_1$, $S_2$, or $S_3$, as described above. In FIG. 12A, a display to a user is depicted in the form of an actual value plot (e.g., centered about a measured value) for magnetic field B, along with respective adaptive QC criteria, such as may be calculated using covariant matrices $S_2$ or $S_3$, as described above. In FIG. 12B, a display to a user is depicted in the form of an actual value plot (e.g., centered about a measured value) for magnetic dip angle φ, along with respective adaptive QC criteria, such as may be calculated using covariant matrices $S_2$ or $S_3$, as described above. In particular, the plots in FIGS. 11, 12A and 12B are shown as respective plots of measurement values bounded by inner limits and outer limits. In FIGS. 11, 12A and 12B, the inner limits may indicate pass or fail of the measurement values and the outer limits may indicate fail of the measurement values, with respect to adaptive QC criteria. For example, in FIGS. 12A and 12B, both the inner limits and the outer limits narrow the bounded ranges as drilling proceeds, which indicates that the QC criteria are adaptive to previous measurements and incorporate constraints on measured values from previously measured values, such as calculated using covariant matrix $S_2$ during drilling, for example. In FIGS. 12A and 12B, the area between the inner limits is displayed as a first color, and the area between each inner limit and the corresponding outer limit is displayed as a second color. In FIGS. 12A and 12B, the first color may be green, while the second color may be yellow, for example. In FIGS. 12A and 12B, the area beyond, the outer limit may be displayed in a third color, winch may be red, for example.

In summary, methods are disclosed for validating directional surveys. The methods disclosed herein describe how errors in the survey are evaluated against various error values to determine if the errors pass or fail QC standards. When the errors are found to fail QC standards by any of the methods disclosed herein, an automated drilling system incorporating the methods disclosed herein may make a determination while drilling. For example, the automated drilling system may determine that drilling according to a given drilling plan may continue. In another example, the automated drilling system may determine that drilling according to the drilling plat should be stopped, and may generate a corresponding alarm. In yet another example, the automated drilling system may determine that drilling according to the drilling plan can continue, but that evaluation of certain survey data or certain errors found in the survey data should be escalated for evaluation by an expert. In this manner, the methods and determinations described herein may support automated drilling and the use of an automated drilling system, and may enable precise, accurate, and safe drilling by relatively inexperienced personnel, because the automated drilling system can implement validation of directional surveys, as disclosed herein.

As disclosed herein, a method of validating a directional survey includes measuring the gravity and magnetic field vectors using, a surveying tool and computing an overall statistical distance of the measurement. The statistical distance may be calculated from reference values associated with the surveying tool using corresponding surveying tool codes. In a further aspect, an error covariance math may be used to determine whether the new errors in a survey are consistent or not with errors from one or e previous surveys.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for monitoring drilling, the system comprising:
   a processor;
   a memory coupled to the processor, wherein the memory comprises instructions executable by the processor for:
      during drilling of a borehole by a drilling system, receiving a first survey from a measurement-while-drilling (MWD) tool, wherein the first survey comprises a first measurement of a gravity vector G and a second measurement of a magnetic field vector B;
      calculating a magnetic dip angle φ responsive to the second measurement of the magnetic field vector B;
      generating, a first covariant matrix describing the relationship of a plurality of measured values to expected errors in the measured values, wherein:
         generating the first covariant matrix comprises calculating a plurality of intermediate values based on error estimates for the first measurement of the gravity vector G, the second measurement of the magnetic field vector B, and the magnetic dip angle φ, wherein the error estimates are calculated using a plurality of tool code error coefficients; and
         the first covariant matrix comprises a square matrix providing joint variance between the plurality of intermediate values to indicate the relationship of the plurality of measured values to the expected errors in the measured values;
      generating a plurality of residual values corresponding to the first measurement and the second measurement as a difference between a reference value and a measured value for each of first measurement of the gravity vector G and the second measurement of the magnetic field vector B;
      computing an error ellipsoid based on the residual values and the first covariant matrix, wherein the error ellipsoid describes the bounds for residual values for the first measurement of the gravity vector G and the second measurement of the magnetic field vector B;
      comparing the first survey with the error ellipsoid to determine if the first survey is acceptable; and
      when the first survey is not acceptable based on the error ellipsoid, generating a first indication that the drilling should stop.

2. The system of claim 1, further comprising instructions for:
   when the first indication is generated, generating a second indication that an assessment of a trajectory of the borehole is to be performed before drilling resumes.

3. The system of claim 1, further comprising instructions for:
   generating a plurality of second residual values based on differences between a plurality of previously measured values of the gravity vector G and the magnetic vector B, and the most recent measurements of the gravity vector G and the magnetic vector B;
   generating a second covariant matrix describing the relationship of measured values to expected errors in the measured values based on the previously measured values; and
   computing a second error ellipsoid describing bounds for residual values for the first measurement of the gravity vector G and the second measurement of the magnetic field vector B responsive to the second residual values and the second covariant matrix.

4. The system of claim 1, wherein the instructions for comparing the first survey with the error ellipsoid to determine if the first survey is acceptable further comprise instructions for:
computing a statistical distance associated with the first measurement of the gravity vector G and the second measurement of the magnetic field vector B responsive to the tool codes.

5. The system of claim 4, further comprising instructions for:
displaying the statistical distance against a sigma threshold.

6. The system of claim 5, wherein the instructions for comparing the first survey with the error ellipsoid to determine if the first survey is acceptable further comprise instructions for:
classifying the first survey as pass or fail, based on a value of the statistical distance with respect to the sigma threshold.

7. The system of claim 1, wherein the instructions for comparing the first survey with the error ellipsoid to determine if the first survey is acceptable further comprise instructions for:
computing a probability associated with the first measurement of the gravity vector G and the second measurement of the magnetic field vector B responsive to the tool codes.

8. The system of claim 7, further comprising instructions for:
displaying the probability against a probability threshold.

9. The system of claim 8, wherein the instructions for comparing the first survey with the error ellipsoid to determine if the first survey is acceptable further comprise instructions for:
classifying the first survey as pass or fail, based on a value of the probability with respect to the probability threshold.

10. The system of claim 7, wherein the probability is a Mahalanobis distance.

11. A method for monitoring drilling, the method comprising:
during drilling of a borehole by a drilling system, receiving a first survey from a measurement-while-drilling (MWD) tool, wherein the first survey includes a plurality of measurements of a gravity vector G and a magnetic field vector B;
using the magnetic field vector, calculating a magnetic dip angle $\varphi$;
generating a first covariant matrix describing the relationship of measurements to expected errors in the measurements, wherein:
generating the first covariant matrix comprises calculating a plurality of intermediate values based on error estimates for the gravity vector G, the magnetic field vector B, and the magnetic dip angle $\varphi$, wherein the error estimates are calculated using a plurality of tool code error coefficients; and
the first covariant matrix comprises a square matrix providing joint variance between the plurality of intermediate values to indicate the relationship of the plurality of measured values to the expected errors in the measured values;
generating a plurality of residual values corresponding to the plurality of measurements, wherein each residual value comprises a difference between a reference value and a measured value for each of the plurality of measurements;
responsive to the residual values and the first covariant matrix, computing an error ellipsoid based on the residual values and the first covariant matrix, wherein the error ellipsoid describes the bounds for residual values for the plurality of measurements;
comparing the first survey with the error ellipsoid to determine if the first survey is within acceptable limits; and
when the first survey is not within acceptable limits, generating a first indication that the drilling should stop.

12. The method of claim 11, further comprising:
when the first indication is generated, generating a second indication that an assessment of a trajectory of the borehole should be performed before drilling resumes.

13. The method of claim 11, further comprising:
generating second residual values based on differences between previously obtained measurements and the measured value for each of the plurality of measurements;
generating a second covariant matrix describing the relationship of measured values to expected errors in the measured values based on the previously measured values; and
responsive to the second residual values and the second covariant matrix, computing the error ellipsoid describing bounds for residual values for the measurements.

14. The method of claim 11, wherein comparing the first survey with the error ellipsoid to determine if the first survey is acceptable further comprises:
computing a statistical distance associated with the measurements based on the tool codes.

15. The method of claim 14, further comprising:
displaying the statistical distance against a sigma threshold.

16. The method of claim 15, wherein comparing the first survey with the error ellipsoid to determine if the first survey is acceptable further comprises:
classifying the first survey as pass or fail, based on a value of the statistical distance with respect to the sigma threshold.

17. The method of claim 11, wherein comparing the first survey with the error ellipsoid to determine if the first survey is acceptable further comprises:
computing a probability associated with the measurements based on the tool codes.

18. The method of claim 17, further comprising:
displaying the probability against a probability threshold.

19. The method of claim 18, wherein comparing the first survey with the error ellipsoid to determine if the first survey is acceptable further comprises:
classifying the first survey as pass or fail, based on a value of the probability with respect to the probability threshold.

20. The system of claim 17, wherein the probability is a Mahalanobis distance.

21. The method of claim 11, further comprising:
displaying at least one indication of the gravity vector, the magnetic field vector, and the magnetic dip angle together with inner error limits, wherein the inner error limits define a pass range.

22. The method of claim 11, further comprising:
displaying at least one indication of the gravity vector, the magnetic field vector, and the magnetic dip angle together with outer error limits, wherein the outer error limits define a fail threshold.

23. The method of claim 11, further comprising:
displaying at least one indication of the gravity vector, the magnetic field vector, and the magnetic dip angle together with both inner error limits and outer error limits, wherein the ranges between the inner error limits and the outer error limits indicate a pass or fail range.

24. A system for monitoring drilling, the system comprising:
a processor;
a memory coupled to the processor;
a display device coupled to the processor, wherein the memory comprises instructions executable by the processor for performing the steps of:
during drilling of a borehole by a drilling system, receiving a first survey from a measurement-while-drilling (MWD) tool, wherein the first survey includes measurements of a gravity vector G and a magnetic field vector B;
responsive to the magnetic field vector, calculating a magnetic dip angle φ;
generating a first covariant matrix describing the relationship of a plurality of measured values to a plurality of expected errors in the measured values, wherein:
generating the first covariant matrix comprises calculating a plurality of intermediate values based on error estimates for the gravity vector G, the magnetic field vector B, and the magnetic dip angle φ, wherein the error estimates are calculated using a plurality of tool code error coefficients; and
the first covariant matrix comprises a square matrix providing joint variance between the plurality of intermediate values to indicate the relationship of the plurality of measured values to the expected errors in the measured values;
generating residual values corresponding to the measurements as differences between each reference value and each associated measured value for each of the measurements;
responsive to the residual values and the first covariant matrix, computing a statistical distance associated with the measurements, the statistical distance describing bounds for residual values for the measurements; and
displaying on the display device a comparison of at least a portion of the first survey with the statistical distance to provide a visual indication of whether the first survey is within acceptable limits.

25. The system of claim 24, further comprising instructions for:
when the first survey is not within acceptable limits, generating a first indication that the drilling should stop.

26. The system of claim 24, further comprising instructions for:
when the first indication is generated, generating a second indication that an assessment of a wellbore trajectory of the borehole is to be performed before drilling can resume.

27. The system of claim 24, further comprising instructions for:
generating second residual values based on differences between previously measured values and a most recently measured value for each of the measurements;
generating a second covariant matrix describing the relationship of measured values to expected errors in the measured values based on the previously measured values; and
using the second residual values and the second covariant matrix, computing the statistical distance describing bounds for residual values for the measurements.

28. The system of claim 24, wherein the instructions for comparing the first survey with the statistical distance to determine if the first survey is acceptable further comprise instructions for:
computing an error ellipsoid associated with the measurements based on the tool codes.

29. The system of claim 28, further comprising instructions for:
displaying the error ellipsoid against at least one sigma threshold.

30. The system of claim 29, wherein the instructions for comparing the first survey with the error ellipsoid to determine if the first survey is acceptable further comprise instructions for:
classifying the first survey as pass or fail, based on a value of the statistical distance with respect to the sigma threshold.

31. The system of claim 29, wherein a sigma threshold is displayed as a rectangle bounded by the error ellipsoid.

32. The system of claim 24, wherein the comparison is displayed as a plot with at least one shaded region representing a QC threshold.

33. The system of claim 24, wherein the comparison is displayed as a plot of measurement values bounded by inner limits and outer limits.

34. The system of claim 33, wherein the inner limits indicate pass or fail of the measurement values and the outer limits indicate fail of the measurement values.

35. The system of claim 33, wherein the area between the inner limits is displayed as a first color, and the area between each inner limit and the corresponding outer limit is displayed as a second color.

36. The system of claim 35, wherein the first color is green.

37. The system of claim 36, wherein the second color is yellow.

38. The system of claim 33, further comprising instructions for:
accessing data from at least one previous survey of the borehole performed prior to the first survey, wherein the inner limits and the outer limits are adaptive responsive to the at least one previous survey.

39. The system of claim 38, wherein the visual indication is updated with additional data responsive to a second survey performed after the first survey.

40. The system of claim 24, wherein the visual indication is updated with additional data as the borehole is drilled.

* * * * *